(12) United States Patent
Ataka et al.

(10) Patent No.: US 9,659,592 B2
(45) Date of Patent: May 23, 2017

(54) PERPENDICULAR MAGNETIC RECORDING MEDIUM AND METHOD OF MANUFACTURING SAME

(75) Inventors: Toyoji Ataka, Kedah Darul Aman (MY); Shunji Takenoiri, Minami-Alps (JP); Sadayuki Watanabe, Tokyo (JP); Hirohisa Oyama, Kedah Darul Aman (MY); Yasuaki Hozumi, Tokyo (JP); Satoshi Takahashi, Tokyo (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 202 days.

(21) Appl. No.: 13/817,141

(22) PCT Filed: May 1, 2012

(86) PCT No.: PCT/JP2012/002956
§ 371 (c)(1),
(2), (4) Date: Mar. 26, 2013

(87) PCT Pub. No.: WO2012/164825
PCT Pub. Date: Dec. 6, 2012

(65) Prior Publication Data
US 2013/0209836 A1    Aug. 15, 2013

(30) Foreign Application Priority Data
Jun. 3, 2011    (JP) .................................. 2011-125066

(51) Int. Cl.
*G11B 5/66*    (2006.01)
*G11B 5/73*    (2006.01)
(Continued)

(52) U.S. Cl.
CPC .................. *G11B 5/66* (2013.01); *G11B 5/73* (2013.01); *G11B 5/7325* (2013.01);
(Continued)

(58) Field of Classification Search
None
See application file for complete search history.

(56) References Cited

U.S. PATENT DOCUMENTS 6,383,667 B1 * 5/2002 Futamoto et al. .......... 428/836.3
2002/0127435 A1 * 9/2002 Uwazumi ............ G11B 5/7325
428/833

(Continued)

FOREIGN PATENT DOCUMENTS

CN     101162587 A     4/2008
JP     2002-358617 A   12/2002

(Continued)

OTHER PUBLICATIONS

"Suichoku Jiki Kiroku no Saishin Gijutsu" (The latest technology of perpendicular magnetic recording), H. Nakamura, ed., CMC Publishing (2007), pp. 127-131.

*Primary Examiner* — Holly Rickman
*Assistant Examiner* — Lisa Chau
(74) *Attorney, Agent, or Firm* — Rabin & Berdo, P.C.

(57) ABSTRACT

A perpendicular magnetic recording medium exhibits reduced noise and improved performance in such measures as SN ratio, and can realize high magnetic recording densities. In the perpendicular magnetic recording medium, at least a first nonmagnetic intermediate layer, second nonmagnetic intermediate layer, and magnetic recording layer are stacked in order on a nonmagnetic substrate. The first nonmagnetic intermediate layer is formed from a CoCrRuW alloy, and the second nonmagnetic intermediate layer is formed from an Ru-base alloy.

5 Claims, 14 Drawing Sheets

(51) Int. Cl.
*G11B 5/85* (2006.01)
*G11B 5/851* (2006.01)
*G11B 5/84* (2006.01)

(52) U.S. Cl.
CPC .............. *G11B 5/8404* (2013.01); *G11B 5/85* (2013.01); *G11B 5/851* (2013.01)

(56) References Cited

U.S. PATENT DOCUMENTS

| | | | |
|---|---|---|---|
| 2002/0182446 A1 | 12/2002 | Takenoiri et al. | |
| 2004/0191576 A1* | 9/2004 | Shimizu | G11B 5/656 428/833 |
| 2005/0153169 A1 | 7/2005 | Watanabe et al. | |
| 2006/0088733 A1* | 4/2006 | Hosoe | G11B 5/65 428/827 |
| 2008/0024918 A1 | 1/2008 | Gouke | |
| 2008/0075979 A1 | 3/2008 | Inamura et al. | |
| 2008/0096055 A1 | 4/2008 | Takenoiri et al. | |
| 2008/0170329 A1 | 7/2008 | Thangaraj et al. | |
| 2008/0292908 A1* | 11/2008 | Mukai | G11B 5/65 428/831 |
| 2010/0035085 A1 | 2/2010 | Jung et al. | |
| 2010/0039730 A1 | 2/2010 | Ishibashi et al. | |
| 2010/0196741 A1* | 8/2010 | Sonobe | G11B 5/667 428/831 |

FOREIGN PATENT DOCUMENTS

| | | |
|---|---|---|
| JP | 2003-036525 A | 2/2003 |
| JP | 2003-168207 A | 6/2003 |
| JP | 2005-196898 A | 7/2005 |
| JP | 2006-277950 A | 10/2006 |
| JP | 2008-034060 A | 2/2008 |
| JP | 2008-084413 A | 4/2008 |
| JP | 4224804 A | 12/2008 |
| JP | 2009-223972 A | 10/2009 |
| JP | 2010-044842 A | 2/2010 |
| JP | 2010-518536 A | 5/2010 |

* cited by examiner

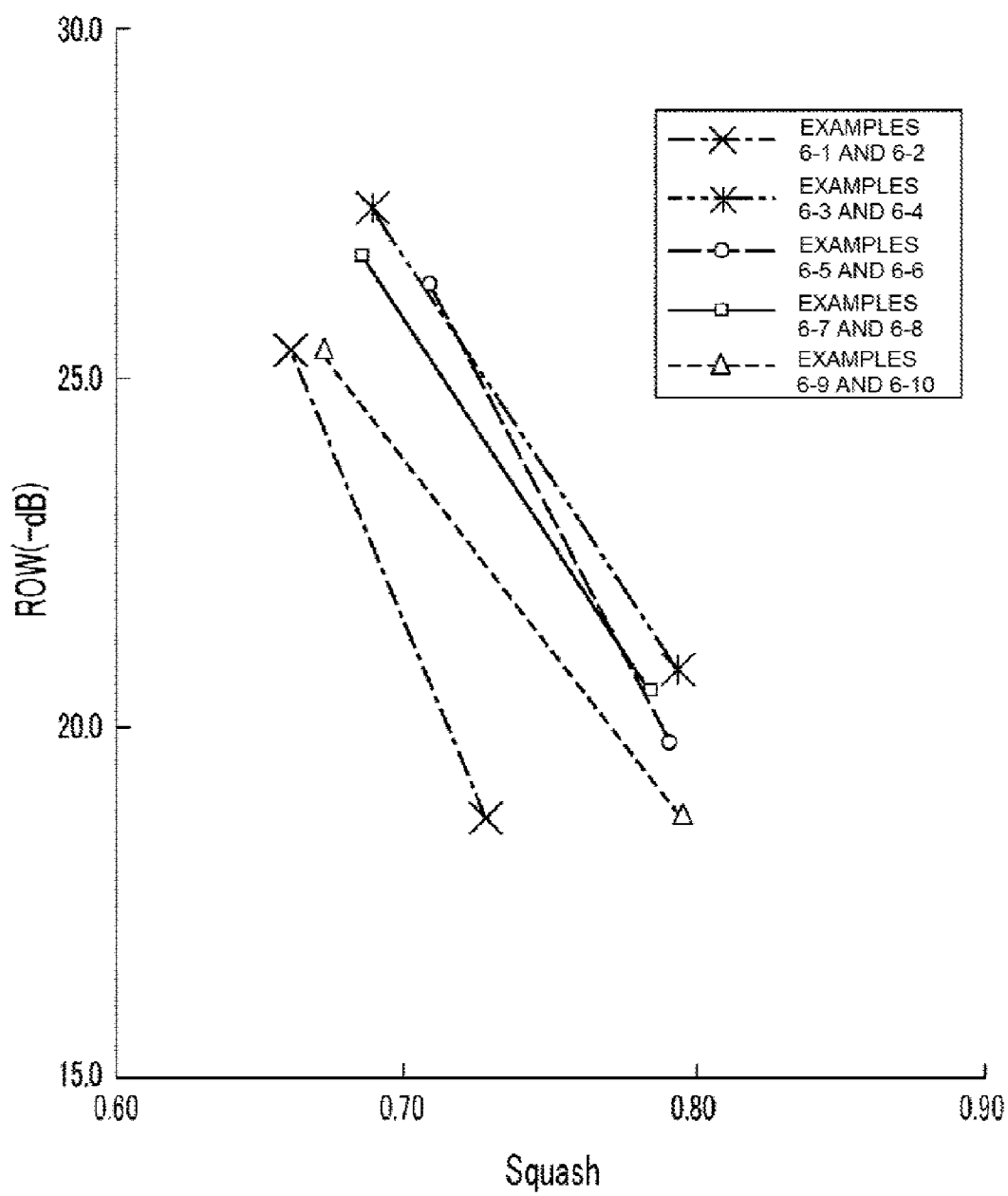

PERPENDICULAR MAGNETIC RECORDING MEDIUM AND METHOD OF MANUFACTURING SAME

TECHNICAL FIELD

The present invention relates to a perpendicular magnetic recording medium to be mounted on various magnetic recording devices. More specifically, this invention relates to a perpendicular magnetic recording medium capable of high-density magnetic recording to be mounted on hard disk drives used as external storage devices for computers, audio and video equipment, and similar.

BACKGROUND ART

In recent years, magnetic recording media used in hard disk drives (HDDs) have used a perpendicular magnetic recording method as a technique to realize high densities in magnetic recording. As the layer configuration thereof, for example an underlayer, a magnetic recording layer, a protective film, and a liquid lubricating film are stacked, in order, on a nonmagnetic substrate. In a perpendicular magnetic recording method, there is the advantage that at recorded bits recorded in the perpendicular magnetic recording medium, due to the effect of the demagnetizing field of adjacent recorded bits, the higher the recording density the more stable is the magnitude of the residual magnetization. As a result, a perpendicular magnetic recording medium with excellent thermal stability can be realized.

Various methods for further raising the recording density of perpendicular magnetic recording media have been studied. For example, in a method using what is called a dual-layer perpendicular magnetic recording medium, a medium having a soft magnetic underlayer between the underlayer and the substrate is used. In a dual-layer perpendicular magnetic recording medium, the soft magnetic underlayer steeply draws in the magnetic field generated by the magnetic head, so that the magnetic field gradient is smaller, and the effect of recorded signal spreading is reduced (see for example Non-patent Reference 1 and similar).

In addition, in order to realize still higher recording densities for perpendicular magnetic recording media, finer magnetic crystal grains, improved isolation of such grains, and reduction of the orientation dispersion $\Delta\theta 50$ of the c axis which is the axis of easy magnetization of the magnetic layer, are being studied, and perpendicular magnetic recording media having various layer structures as described below are being proposed.

For example, Patent Reference 1 discloses a perpendicular magnetic recording medium including a soft magnetic underlayer, orientation controlling underlayer the main components of which are NiCr and NiCu and having the fcc structure, and a recording layer comprising a perpendicular magnetization film having the hcp structure. Further, Patent Reference 1 discloses that at least one element from among Fe, Al, Rh, Pd, Ag, Pt and Au is added to the orientation controlling underlayer; and that a nonmagnetic amorphous layer of which the main component is one element among Ta, W and Mo is used on the side below the orientation controlling underlayer; and that an orientation controlling intermediate layer comprising either an Ru alloy or Ti is used between the orientation controlling underlayer and the recording layer.

Further, Patent Reference 2 discloses a magnetic recording medium having at least a underlayer, orientation control layer, magnetic recording layer and protective layer on a substrate, wherein the orientation control layer has a stacked structure having at least a seed layer and an intermediate layer, the seed layer is disposed on the substrate side of the intermediate layer, and moreover the seed layer has a Cu—Ti alloy layer the main component of which is Cu. It is further disclosed that the intermediate layer has as the main material at least one among Ru, Re, and an alloy of these, and has the hcp structure. It is further disclosed that by providing two layers in the intermediate layer, both crystal orientation and finer structure are attained.

Patent Reference 3 discloses a perpendicular magnetic recording medium having, in order on a nonmagnetic substrate, an underlayer, a magnetic recording layer, a protective layer, and a liquid lubricating layer, and which is characterized in that the underlayer includes nonmagnetic NiFeCr. It is also disclosed that an intermediate layer including one among the nonmagnetic materials CoCr, CoCrB, Ru, and Pd is included between the underlayer and the magnetic recording layer.

Patent Reference 4 discloses a perpendicular magnetic recording medium having, in order on a nonmagnetic substrate, a soft magnetic underlayer, an intermediate layer, a magnetic layer which is a CoCr based alloy layer, a protective layer, and a liquid lubricating layer, and in which the magnetic layer comprises a granular-structure first magnetic layer and a nongranular-structure second magnetic layer. It is further disclosed that the intermediate layer comprises an alloy including at least one of metal from among Ti, Re, Ru and Os having the hcp structure.

Patent Reference 5 discloses a perpendicular magnetic recording medium comprising, stacked in order on a nonmagnetic substrate, a seed layer, an underlayer, a magnetic recording layer and a covering layer, wherein the magnetic recording layer comprises a structure in which are stacked magnetic layers of different materials. It is further disclosed that as the seed layer, a NiFe alloy or an alloy of NiFe with at least one among B, Si, Nb and Mo added, or Co or an alloy of Co with at least one among B, Si, Nb, Mo, Fe and Ni added, is used, and that as the underlayer, for example a metal with the hcp structure such as Ti, Zr, Ru, Zn, Tc, Re or similar, or a metal with the fcc structure such as Cu, Rh, Pd, Ag, Ir, Pt, Au, Ni and Co, or similar is used.

Patent Reference 6 discloses a perpendicular magnetic recording medium comprising, stacked in order on a nonmagnetic substrate, a soft magnetic underlayer, an intermediate layer, a magnetic layer which is a CoCr based alloy layer, a protective layer, and a liquid lubricating layer, and wherein the magnetic layer comprises a granular-structure first magnetic layer and a nongranular-structure second magnetic layer. It is also disclosed that the intermediate layer comprises one metal among Ti, Re, Ru and Os having the hcp structure or an alloy including at least one metal among Ti, Re, Ru and Os.

Patent Reference 7 discloses a magnetic recording medium having, on a substrate, a soft magnetic underlayer, FeCoB seed layer, fcc structure crystal orientation controlling layer, nonmagnetic underlayer, and magnetic recording layer, wherein the crystal orientation controlling layer is formed from an alloy including at least one element from among Ni, Fe, Co, Cu, Rh, Ir, Pd, Pt, Al, Au and Ag. Patent Reference 8 discloses a method of manufacture of a perpendicular magnetic recording medium comprising, stacked in order on a nonmagnetic substrate, at least an underlayer, a magnetic recording layer, a protective layer and a liquid lubricant layer, wherein a seed layer which is an NiFe or other Ni based alloy is further provided below the underlayer comprising Ru or an alloy including at least Ru such as RuW, RuTi, RuAl, RuCu, RuSi, RuC, RuB, RuCoCr, or similar. It is further disclosed that the magnetic recording layer comprises a structure called a granular layer in which fine particles of a CoCrPt alloy have an oxide such as $SiO_2$ or $TiO_2$ segregated at the grain boundaries.

On the other hand, Patent Reference 9 discloses a perpendicular magnetic recording medium including a seed layer including amorphous Ta, a nonmagnetic fcc alloy underlayer including Ni and W, a nonmagnetic hcp underlayer and a magnetic layer, and states that an $RuCr_{30}$ underlayer is used as the hcp underlayer, and also discloses that it is desirable that noble metal elements such as Ru and Pt be removed insofar as possible from within the medium.

Patent Reference 1: Japanese Patent Application Laid-open No. 2008-34060
Patent Reference 2: Japanese Patent Application Laid-open No. 2010-44842
Patent Reference 3: Japanese Patent Application Laid-open No. 2002-358617
Patent Reference 4: Japanese Patent Application Laid-open No. 2003-168207
Patent Reference 5: Japanese Patent Application Laid-open No. 2005-196898
Patent Reference 6: Japanese Patent Application Laid-open No. 2006-277950
Patent Reference 7: Japanese Patent Application Laid-open No. 2008-84413
Patent Reference 8: Japanese Patent Publication No. 4224804
Patent Reference 9: Japanese Translation of PCT Application No. 2010-518536
Non-patent Reference 1: "Suichoku Jiki Kiroku no Saishin Gijutsu" (The latest technology of perpendicular magnetic recording), H. Nakamura, ed., CMC Publishing (2007), pp. 127-131

In this way, numerous techniques have been proposed for raising the recording densities of perpendicular magnetic recording media. However, the characteristics of a perpendicular magnetic recording medium depend on the components and composition of each stacked layer, and on the stacking order and other matters, and in the techniques proposed in the prior art it cannot be said that these matters are all optimized, and hence medium characteristics have merits and demerits. Therefore in recent years there have been demands for further improvements to the characteristics of perpendicular magnetic recording media.

In order to attain a high signal-noise ratio (SN ratio) through increases in the signal output and decreases in the noise of perpendicular magnetic recording media, orientation dispersion in the magnetic recording layer must be made as small as possible. Further, in order to reduce noise in magnetic recording media, crystal grain diameters in the magnetic recording layer must be decreased.

On the other hand, the seed layer or intermediate layer has the function of controlling the crystallinity, orientation, crystal grain diameters and similar of the magnetic recording layer formed thereabove, and are known to affect the characteristics of the magnetic recording layer. Hence in order to decrease crystal grain diameters of the magnetic recording layer material, decreasing the crystal grain diameters in the seed layer or intermediate layer is effective.

However, when the film thickness of the seed layer or intermediate layer is reduced, a decline in the crystal orientation of the magnetic recording layer material and inhibition of magnetic isolation of magnetic crystal grains occur, and it is also known that the magnetic characteristics of the magnetic recording layer decline. Hence in consideration of these matters, it is necessary to control the film thickness of the seed layer or intermediate layer while maintaining or improving the magnetic characteristics of the magnetic recording layer.

DISCLOSURE OF THE INVENTION

Hence an object of the present invention is to provide a perpendicular magnetic recording medium in which orientation dispersion in the magnetic recording layer is reduced and crystal grain diameters are made finer, while simultaneously enabling reduction of the film thickness of the seed layer and intermediate layer, and consequently enabling reduction of noise and improvement of performance such as the SN ratio.

In consideration of these matters, the inventors ascertaining that by stacking a plurality of nonmagnetic intermediate layers comprising specific metal alloys, the film thicknesses of each can be made thinner than the film thickness when a single layer is used as the intermediate layer, and grain diameters in the magnetic recording layer can be made finer without degrading the characteristics of the magnetic recording layer, and so attained the following features.

A perpendicular magnetic recording medium of the present invention comprises, stacked in order on a nonmagnetic substrate, at least a first nonmagnetic intermediate layer, a second nonmagnetic intermediate layer, and a magnetic recording layer, and is characterized in that the first nonmagnetic intermediate layer is formed from a CoCrRuW alloy, and moreover the second nonmagnetic intermediate layer is formed from an Ru-base alloy.

In the present invention, it is desirable that the CoCrRuW alloy have a Cr content of 14.5 at % or higher and 25.5 at % or lower, a Ru content of 4.5 at % or higher and 20.5 at % or lower, and a W content of 4.5 at % or higher and 8.5 at % or lower, and that the remainder be Co. Further, the film thickness of the first nonmagnetic intermediate layer is 5 to 14 nm, and preferably 6 to 12 nm. Further, it is desirable that the magnetic recording layer include a granular structure.

The present invention also includes a method of manufacture of such perpendicular magnetic recording media.

The present invention provides a perpendicular magnetic recording medium in which noise is further reduced and performance such as the SN ratio and similar is improved, and which can realize high-density magnetic recording.

BRIEF DESCRIPTION OF THE DRAWINGS

FIG. 13 plots Squash values versus ROW in Example 6.

MODE FOR CARRYING OUT THE INVENTION

Below, embodiments of the invention are explained. The embodiments described below are merely examples of the invention, and various design modifications can be made as appropriate by a person skilled in the art.

Figure 1A:
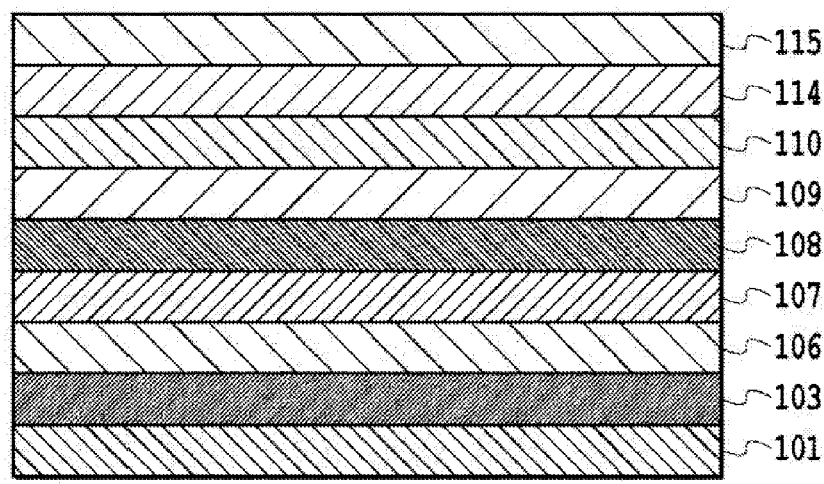
FIG. 1 is a schematic cross-sectional view showing the layer configuration of a perpendicular magnetic recording medium of the present invention.
Figure 1B:
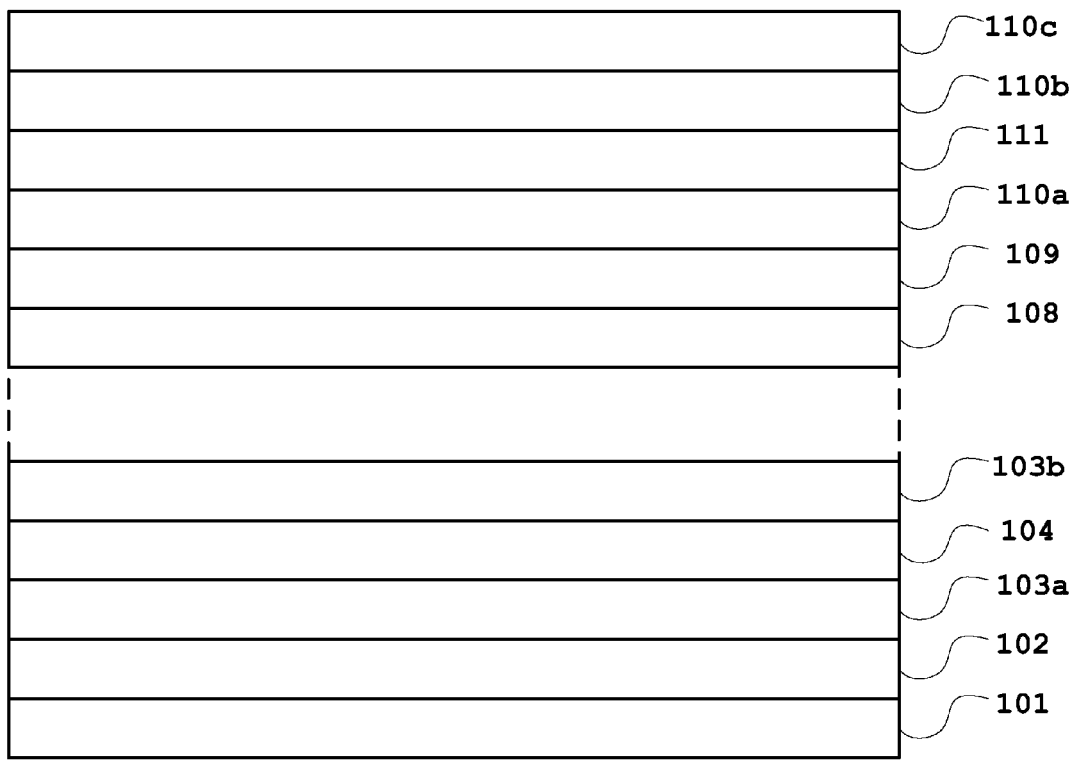

FIG. 1 is a cross-sectional view showing a perpendicular magnetic recording medium of the invention. The perpendicular magnetic recording medium of the invention comprises, in order on a nonmagnetic substrate 101, a soft magnetic underlayer 103, first nonmagnetic intermediate layer 108, second nonmagnetic intermediate layer 109, and magnetic recording layer 110. A perpendicular magnetic recording medium of this invention may optimally have, between the soft magnetic underlayer 103 and first nonmagnetic intermediate layer 108, a pre-seed layer 106 and seed layer 107, as shown in FIG. 1. Further, a perpendicular magnetic recording medium of the invention may optionally have a protective layer 114 formed on the magnetic recording layer 110 and may have a lubricating layer 115 formed on the protective layer 114, as shown in FIG. 1.

(Nonmagnetic Substrate)

The nonmagnetic substrate 101 used in the invention is a nonmagnetic member; various substrates which can withstand the conditions (solvent, temperature and similar) used in formation of the various layers, described below, and the surface of which is flat, can be used. Specifically, substrates comprising an Al alloy with NiP plating, reinforced glass, crystallized glass, silicon, and other materials, can be used.

It is preferable that the nonmagnetic substrate 101 be cleaned prior to forming the other constituent elements 102 to 115. Cleaning can be performed using a scrubbing method employing a brush or sponge, a high-pressure water spraying method, a method of immersion in an alkaline detergent, or similar. After performing cleaning using these methods, irradiation with ultraviolet rays can further be performed.

A adhesive layer 102 may be optionally provided on the nonmagnetic substrate 101 of this invention. The adhesive layer 102 is used in order to heighten the adhesiveness between the soft magnetic underlayer 103 formed thereupon and the nonmagnetic substrate 101. As the material of the adhesive layer 102, a CrTi alloy or similar, or another material with good adhesiveness with the glass or other substrate material can be used.

(Soft Magnetic Underlayer)

The soft magnetic underlayer 103 is formed on the nonmagnetic substrate 101 or the adhesive layer 102, and is a constituent element which serves to secure an adequate perpendicular-direction magnetic field, so as to prevent spreading of magnetic flux generated from the magnetic head at the time of information recording. As the material of the soft magnetic underlayer 103, an Ni alloy, Fe alloy, or Co alloy can be used. In particular, by using amorphous CoZrNb, CoTaZr, CoTaZrNb, CoFeZrNb, CoFeNiZrNb, CoFeTaZrNb, CoFeTaZr, CoFeZrTaTiNb, FeCoTaB or similar, satisfactory electromagnetic transducing characteristics can be obtained.

The soft magnetic underlayer 103 can also be formed as a single-layer film having a specific composition. Further, the soft magnetic underlayer 103 of this invention may be a stacked film in which a plurality of magnetic films are ferromagnetically or antiferromagnetically coupled, such that the magnetization recorded in the magnetic recording layer 110 is stabilized and moreover the magnetization intensity leaking from the medium surface is increased, so that noise in the recording medium is reduced as a result. It is preferable that the soft magnetic underlayer 103 include a lower soft magnetic underlayer 103a and an upper soft magnetic underlayer 103b.

The design of the total film thickness of the lower soft magnetic underlayer 103a and upper soft magnetic underlayer 103b can be modified according to the structure and/or characteristics of the magnetic head used in information recording, but when productivity is considered, a film thickness of 10 to 100 nm is preferable. By making the thickness 10 nm or greater, an adequate perpendicular-direction magnetic field can be secured, whereas by making the thickness 100 nm or less, productivity can be improved.

It is still more preferable that the soft magnetic underlayer 103 include, between the lower soft magnetic underlayer 103a and the upper soft magnetic underlayer 103b, a Ru layer 104 which severs the RKKY coupling between the soft magnetic underlayers. The Ru layer 104 is used for the purpose of inducing an antiferromagnetic coupling between the lower and upper soft magnetic underlayers. Further, in place of the Ru layer 104, a nonmagnetic alloy the main component of which is Cr, Cu, Ag or similar may be used.

(Pre-Seed Layer and Seed Layer)

In the invention of the present application, a pre-seed layer 106 and seed layer 107, or a seed layer 107 alone, may optionally be formed on the soft magnetic underlayer 103. The pre-seed layer 106 suitably controls the orientation and grain diameters in the seed layer 107 formed in contact with the layer. The seed layer 107 is a constituent element which is positioned so as to suitably control the orientation and grain diameters in the first nonmagnetic intermediate layer 108 formed thereupon, suitably control the orientation and grain diameters in the second nonmagnetic intermediate layer 109 as well, and as a result suitably realize a favorable perpendicular orientation and favorable grain diameters in the magnetic recording layer 110.

As the material of the pre-seed layer 106, an alloy or intermetallic compound of Ta, Ti, W or similar in the amorphous state, which exhibits broad diffraction lines in XRD and similar and does not have a characteristic crystal structure, can be used.

As the material of the seed layer 107, an Ni-base alloy having the fcc structure can be used. Further, a high-melting-point metal, of which Mo, Ti, Ta, W and similar are representative, may be added to the seed layer 107.

No particular limitations are imposed on the film thicknesses of the pre-seed layer 106 and seed layer 107, so long as the orientation and grain diameters of the layer formed thereupon can be controlled; however, respective film thicknesses of 1 to 20 nm and 3 to 8.5 nm are preferable. Still more preferable are a film thickness for the pre-seed layer 106 of 1 to 9.5 nm and a film thickness for the seed layer 107 of 3.5 to 6.5 nm.

(Nonmagnetic Intermediate Layer)

A nonmagnetic intermediate layer used in the present invention includes a first nonmagnetic intermediate layer 108 comprising a material comprising a CoCrRuW alloy, and a second nonmagnetic intermediate layer 109 comprising a Ru-base alloy. The nonmagnetic intermediate layer is a constituent element having a function of controlling the crystallinity, orientation, crystal grain diameters and similar of the magnetic recording layer 110 formed thereupon. Hence in order to reduce the crystal grain diameters of the magnetic recording layer material, reducing the crystal grain diameters of the nonmagnetic intermediate layer is effective.

On the other hand, it is known that when the film thickness of the intermediate layer is decreased in order to reduce the crystal grain diameters in the nonmagnetic intermediate layer, due to reduced crystal orientation of the magnetic recording layer material, the magnetic characteristics of the magnetic recording layer decline. In consideration of this fact, in addition to simply reducing the film thickness of the nonmagnetic intermediate layer, it is necessary to simultaneously maintain or improve the magnetic characteristics of the magnetic recording layer 110.

This invention can provide the advantageous results, by stacking a plurality of nonmagnetic intermediate layers comprising specific metal alloys, of reducing the respective film thicknesses compared with a case in which a single Ru layer is used as the nonmagnetic intermediate layer, and of making finer the magnetic recording layer grain diameters without degrading the characteristics of the magnetic recording layer 110.

It is preferable that the total film thickness of the first nonmagnetic intermediate layer 108 and the second nonmagnetic intermediate layer 109 be from 10 to 30 nm. By making the total film thickness 10 nm or greater, satisfactory crystallinity is obtained and superior orientation can be realized in both the first nonmagnetic intermediate layer 108 and the second nonmagnetic intermediate layer 109. Hence superior orientation and superior crystal grain isolation is also obtained in the magnetic recording layer 110 positioned above the first nonmagnetic intermediate layer 108 and second nonmagnetic intermediate layer 109.

Further, by making the total film thickness of the first nonmagnetic intermediate layer 108 and second nonmagnetic intermediate layer 109 30 nm or less, excessive enlargement of the grain diameters in both the nonmagnetic intermediate layers is suppressed, excessive enlargement of grain diameters in the magnetic recording layer 110 is suppressed, and as a result a superior SN ratio can be obtained, due to noise reduction in the magnetic recording layer 110. The space between the magnetic recording layer 110 and the soft magnetic underlayer 103 can be reduced, and writability can be maintained at a high level.

It is preferable that the film thicknesses of the first nonmagnetic intermediate layer 108 and the second nonmagnetic intermediate layer 109 each be from 4 to 20 nm. It is preferable that the film thickness of the first nonmagnetic intermediate layer 108 be from 5 to 14 nm, and still more preferable that the film thickness be from 6 to 12 nm. It is preferable that the film thickness of the second nonmagnetic intermediate layer 109 be from 6 to 11 nm, and still more preferable that the film thickness be from 7 to 9 nm.

The first nonmagnetic intermediate layer 108 in the present invention comprises a CoCrRuW alloy having the hcp structure. It is preferable that the CoCrRuW alloy have a Cr content of 14.5 at % or greater and 25.5 at % or less, a Ru content of 4.5 at % or greater and 20.5 at % or less, a W content of 4.5 at % or greater and 8.5 at % or less, and that the remainder be Co, which is the main element. It is still more preferable that the Cr content be 15 at % or greater and 25 at % or less, that the Ru content be 5 at % or greater and 15 at % or less, that the W content be 5 at % or greater and 10 at % or less, and that the remainder be Co.

Adding a high-melting-point metal, of which Mo, Ti, Ta, W and similar are representative, to the thin film alloy material is expected to promote growth of finer crystal grains; in particular, this effect is expected to be greatest for W, which is the metal with the highest melting point. However, when Mo, Ti, Ta, or W metal is added in amounts of 24 at % or greater to Co, intermetallic compounds such as $CoW_3$ and similar are formed, and undesired crystal structures occur; hence addition amounts equal to or less than this are desirable.

The second nonmagnetic intermediate layer 109 in the present invention can be Ru alone, or can be formed using an Ru-base alloy having the hcp structure. Because the atomic radius of Ru is large, W or Ta with larger atomic radii may be added to the second nonmagnetic intermediate layer 109. A Ru-base alloy is an alloy including 5 at % or more Ru, preferably including 70 at % or more, and still more preferably including 95 at % Ru or more.

(Magnetic Recording Layer)

The magnetic recording layer 110 is the constituent element positioned for recording information. When used as a constituent element of a perpendicular magnetic recording medium, the magnetic recording layer 110 must have the easy axis of magnetization oriented in the direction perpendicular to the substrate plane. Specifically, it is preferable that the hcp (0002) plane be oriented parallel to the substrate plane.

Further, it is preferable that the magnetic recording layer 110 present a so-called granular structure, in which ferromagnetic crystal grains comprising a Co-base alloy are surrounded by nonmagnetic crystal grains the main component of which is an oxide. By using a granular structure, the electromagnetic transducing characteristic of the magnetic recording layer 110 is adequately secured, and a superior SN ratio, due to reduced noise in the magnetic recording medium, can be obtained. Here, "the main component of which is an oxide" means that inclusion of other components in minute amounts is not excluded, and means that the oxide exists at approximately 90 molar percent or higher in the nonmagnetic crystal grains.

As the Co-base alloy forming the ferromagnetic crystal grains, CoPt-base alloys, and similar, such as CoPtCr, CoPt, CoPtSi, and CoPtCrB, and CoCr-base alloys such as CoCr, CoCrTa, CoCrTaPt, and similar. Of these, CoPt-base alloys are preferable in that the magnetic anisotropy energy (Ku) can be set high.

As the oxide forming the nonmagnetic crystal grains, $SiO_2$, $Cr_2O_3$, $ZrO_2$, $Al_2O_3$ and similar, which are highly capable of magnetically isolating the ferromagnetic crystal grains of the above-described Co-base alloys, may be used. Among these, $SiO_2$ exhibits superior performance in magnetically isolating ferromagnetic crystal grains comprised by the above-described Co-base alloys, and so is preferable.

Further, the magnetic recording layer 110 may be either a single layer, or a stacked member comprising a plurality of layers (not shown). It is preferable that the magnetic recording layer 110 be a stacked member formed from a plurality of layers, including a plurality of magnetic recording layers.

In one embodiment, in a magnetic recording medium of the invention of the present application, an exchange coupling force controlling layer 111 may be provided between a magnetic recording layer and a magnetic recording layer. The exchange coupling force controlling layer 111 is provided between a first granular magnetic recording layer 110*a* and a second granular magnetic recording layer 110*b*, and by weakening the exchange coupling energy, reduces the demagnetizing field with hardly any degradation of thermal stability, and improves the write characteristics.

As the material of the exchange coupling force controlling layer 111, Ru, RuCo, RuCr, NiCr or similar may be used. The optimal film thickness of the exchange coupling force controlling layer 111 differs depending on the material used, but it is preferable that the film thickness be in the range 0.07 to 0.8 nm. When the film thickness is thinner than 0.07 nm, there is ferromagnetic coupling between the first granular magnetic recording layer 110a and the second granular magnetic recording layer 110b, and write characteristics are degraded. When the film thickness is thicker than 0.8 nm, magnetic coupling between the first granular magnetic recording layer 110a and the second granular magnetic recording layer 110b is completely severed, so that thermal stability is degraded.

In one embodiment, a perpendicular magnetic recording medium of the present invention may be further provided with a nongranular magnetic recording layer 110c (not shown). The nongranular magnetic recording layer 110c secures excellent durability for the magnetic recording medium, and moreover is a constituent element positioned above the exchange coupling force controlling layer 111 or above the second granular magnetic recording layer 110b, in order to suitably control the magnetic characteristics of the entirety of the granular magnetic recording layers 110a and 110b. When used as a constituent element in a perpendicular magnetic recording medium, it is preferable that the nongranular magnetic recording layer 110c have a structure including ferromagnetic crystal grains comprising a Co-base alloy, and nonmagnetic crystal grains of a metal not containing oxides or nitrides of a metal. The nongranular magnetic recording layer 110c can realize superior durability for the magnetic recording medium by blocking Co atoms eluted from the nonmagnetic crystal grain boundaries of the first granular magnetic recording layer 110a and the second granular magnetic recording layer 110b, and moreover can control in a preferable state the magnetic characteristics of the entirety of the first granular magnetic recording layer 110a and second granular magnetic recording layer 110b.

As the metal material forming the nonmagnetic crystal grain boundaries of the nongranular magnetic recording layer 110c, at least one type among Ta, Pt, B, Si, Nb, Cu and Ti may be used. Among these, B exhibits superior performance in magnetically isolating ferromagnetic crystal grains comprising the above-described Co-base alloys, and so is preferable.

The film thickness of the nongranular magnetic recording layer 110c can be set to an arbitrary value so long as the performance of the perpendicular recording medium of the present invention is not inhibited, but is preferably from 1 nm to 5 nm, and still more preferably from 3 nm to 4 nm.

Further, the magnetic recording layer 110 of a perpendicular magnetic recording medium of the present invention can be formed by optionally combining and stacking the above-described granular magnetic recording layers 110a and/or 110b, exchange coupling force controlling layer 111, and nongranular magnetic recording layer 110c, in order to obtain adequate magnetic recording performance. In one embodiment, the second granular layer may be omitted, and the nongranular magnetic recording layer 110c may be deposited directly on the exchange coupling force controlling layer 111.

(Protective Layer and Lubricating Layer)

In the cross-sectional view of the magnetic recording medium of the invention in FIG. 1, the protective layer 114 is a constituent element which protects each of the layers 102 to 110c positioned below the layer 114, and in particular is positioned so as to prevent elution of Co from the lower soft magnetic underlayer 103 and upper soft magnetic underlayer 105. The protective layer 114 can use materials normally used in perpendicular magnetic recording media. For example, diamond-like carbon (DLC), amorphous carbon, or other protective layers the main component of which is carbon (preferably diamond-like carbon), as well as various thin layer materials known to be used as protective layers in magnetic recording media, can be used. As the film thickness of the protective layer 114, a film thickness normally used as a constituent element of a perpendicular magnetic recording medium can be applied.

The lubricating layer 115 is an optional constituent element, provided in liquid form with the object of reducing the friction force occurring between the protective layer 114 and the magnetic head (not shown), and obtaining superior durability and reliability of the magnetic recording medium. As the material of the lubricating layer 115, materials normally used in magnetic recording media can be used. For example perfluoro polyether based lubricants or similar can be used. As the film thickness of the lubricating layer 115, a film thickness normally used as a constituent element of a perpendicular magnetic recording medium can be applied.

(Method of Manufacture)

Each of the layers stacked on the nonmagnetic substrate 101 can be formed by various film deposition techniques commonly used in the field of magnetic recording media. In order to form each of the layers from the adhesive layer 102 to the protective layer 114, for example sputtering methods (including a DC magnetron sputtering method, RF magnetron sputtering method, and similar), vacuum evaporation deposition methods, and similar can be used. In forming the protective layer 114, in addition to the above-described methods, CVD methods and similar can also be used. On the other hand, the lubricating layer 115 can be formed by arbitrary application methods which are known in the field, such as dip coating methods, spin coating methods, and similar.

EXAMPLES

Below, examples of the invention are explained. However, the following examples are merely representative examples used to explain the invention, and do not limit the scope of the invention in any way.

Using the configuration shown in FIG. 1, Examples 1 to 7 as well as Comparative Examples 1 and 2 were fabricated, with the materials and film thicknesses of the layers modified.

Example 1

As the nonmagnetic substrate 101, an Al substrate of diameter 95 mm was used. The Al substrate had a roughness of 1.2 Å (Angstroms) or less, as measured by an AFM in a measurement region of 10 μm by 10 μm. On this substrate, sputtering method were used to deposit each of the layers except for the protective layer and the lubricating layer, and magnetic recording media having the configuration described in Table 1 was fabricated. Unless indicated otherwise, the sputtering methods in this Example were executed using a DC magnetron sputtering apparatus.

First, a CrTi adhesive layer 102 of thickness 13 nm was fabricated on the nonmagnetic substrate 101. Next, a first soft magnetic underlayer 103a comprising FeCoTaB alloy of thickness 13 nm, a Ru layer 104 of thickness 1.2 nm, and a second soft magnetic underlayer 103b comprising FeCoTaB alloy of thickness 12 nm, were formed in order, to form the soft magnetic underlayer 103. A pre-seed layer 106 comprising CrTi alloy and having an amorphous structure was formed to a thickness of 9 nm, and a seed layer 107 comprising NiFeCrWTi alloy was formed to a thickness of 6 nm.

Next, a first nonmagnetic intermediate layer 108 was formed to a thickness of 12 nm on the seed layer 107 by a sputtering method using a Co25Cr5Ru5W alloy target (taking all of the atoms as a reference, comprising 25 at % C, 5 at % Ru, and the remainder Co; similarly below), and a Ru single layer was formed to a thickness of 8 nm to form the second nonmagnetic intermediate layer 109.

Next, on the second nonmagnetic intermediate layer 109 were formed a first magnetic recording layer 110a and a second magnetic recording layer 110b, comprising Co-base alloys, with a Ru single layer as a coupling controlling layer 111 therebetween, and on the second magnetic recording layer 110b was formed a third magnetic recording layer 110c comprising a CoPt alloy, to fabricate the magnetic recording layer 110. Specifically, the first magnetic recording layer 110a and second magnetic recording layer 110b were granular magnetic recording layers, the third magnetic recording layer 110c was a nongranular magnetic recording layer, and the film thicknesses of these layers are as indicated in Table 1.

Thereafter, a CVD method was used to form a carbon protective layer 114 of thickness 2.0 nm on the magnetic recording layer, and then a lubricating layer 115 of perfluoro polyether was formed to a thickness of 9 nm, to fabricate the magnetic recording medium.

(Evaluation Test 1)

Electromagnetic transducing characteristics of the magnetic recording media obtained were evaluated by MFSpiSNR, SqzSNR, Squash, and ROW. Table 2 shows the results of evaluations of the electromagnetic transducing characteristics, at a radial position of 31.37 mm, under conditions, at maximum, of a linear recording density of approximately 2000 kfci and a track pitch of 400 ktpi.

MFSpiSNR is the SN ratio at one-half the frequency of the maximum recording frequency; the higher the value, the higher the density at which recording is possible. At a linear recording density of approximately 1000 kfci, the ratio of the reproduction signal output (S) and the total noize (Nt) was measured using a spectral analyzer, and the value was calculated using the following equation.

$MFSpiSNR = 20 \times \log(S/Nt)$

SqzSNR is the ratio of the signal output $S_1$ remaining in the center track to the total noise (Nt) when the center track is written, and then an adjacent track signal is erased, and is given by the following equation.

$SqzSNR = \log(S_1/Nt)$

Squash is the fraction of the signal output remaining when, after writing to the center track, the adjacent track signal has been erased.

ROW is the ratio of the intensity of the original recorded signal to the incompletely erased signal intensity when a signal recorded at high density is overwritten by a signal recorded at low density. The value resulting when a signal with a linear recording density of 815 kfci was overwritten by a signal with a linear recording density of 108 kfci was measured.

TABLE 2

|  | ROW (−dB) | MFSpiSNR (dB) | SqzSNR (dB) | Squash50 |
| --- | --- | --- | --- | --- |
| Example 1-1 | 28.8 | 13.9 | 13.1 | 0.76 |
| Example 1-2 | 31.9 | 14.0 | 13.0 | 0.70 |
| Comparative Example 1-1 | 27.4 | 13.3 | 12.6 | 0.76 |
| Comparative Example 1-2 | 33.0 | 13.7 | 12.4 | 0.66 |

Comparative Example 1

As the first nonmagnetic intermediate layer 108, a two-layer film of Co25Cr5Mo5Ru of thickness 10 nm and Co24Cr4W of thickness 3 nm was used to fabricate the magnetic recording medium. In addition to the material of the first nonmagnetic intermediate layer 108, Comparative Example 1 was different from Example 1 in that a FeCoZrTaTiNb alloy was used as the material of the first soft magnetic underlayer 103a and second soft magnetic underlayer 103b, the film thickness of the pre-seed layer 106 was 14 nm, and the film thickness of the first nonmagnetic intermediate layer 108 was different. However, the effect of these differences other than the material of the first nonmagnetic intermediate layer 108 on the electromagnetic transducing characteristics was, in terms of the value of MFSpiSNR for the same ROW, overall within approximately 0.1 dB.

Electromagnetic transducing characteristics of fabricated magnetic recording media were evaluated for Comparative Example 1 also, similarly to Example 1. The results are

TABLE 1

Figure 2:
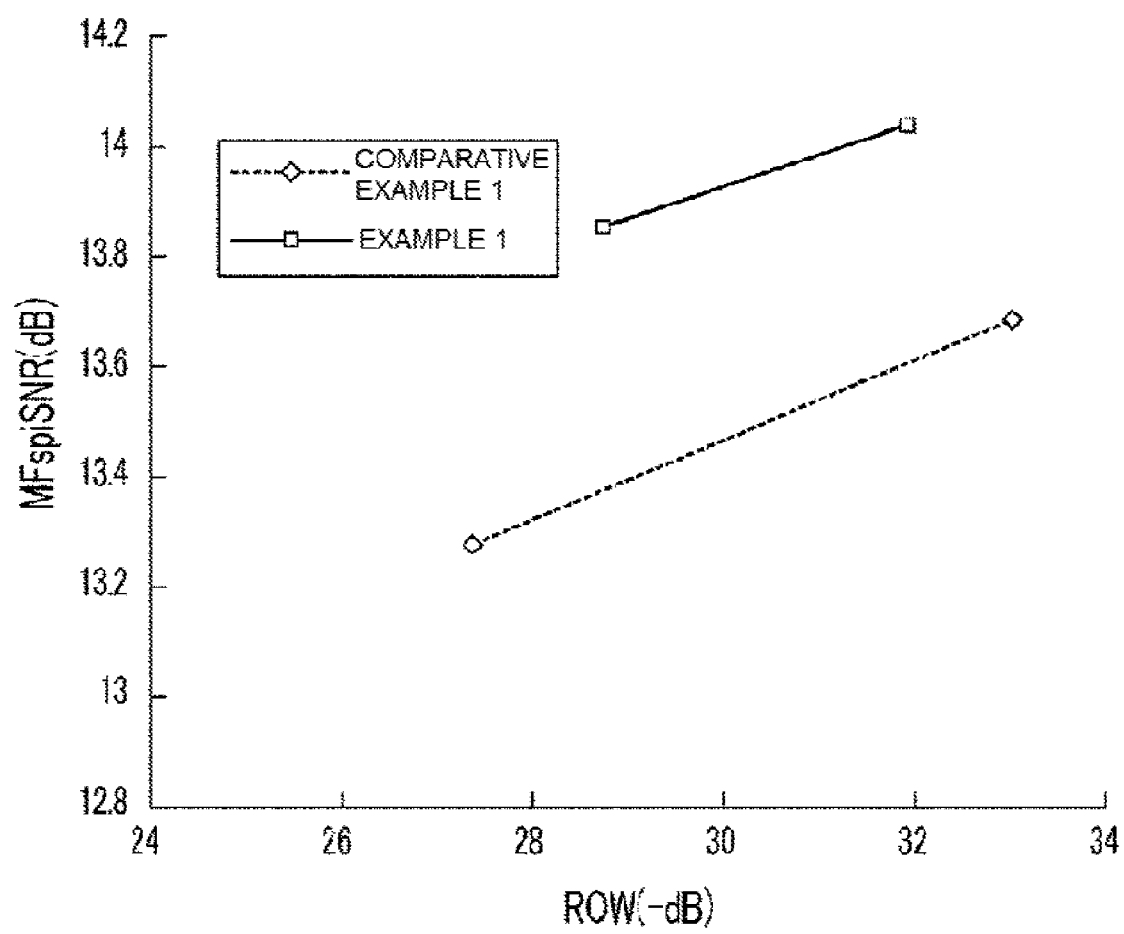
FIG. 2 plots MFspiSNR values versus ROW in Example 1 and Comparative Example 1.
Figure 3:
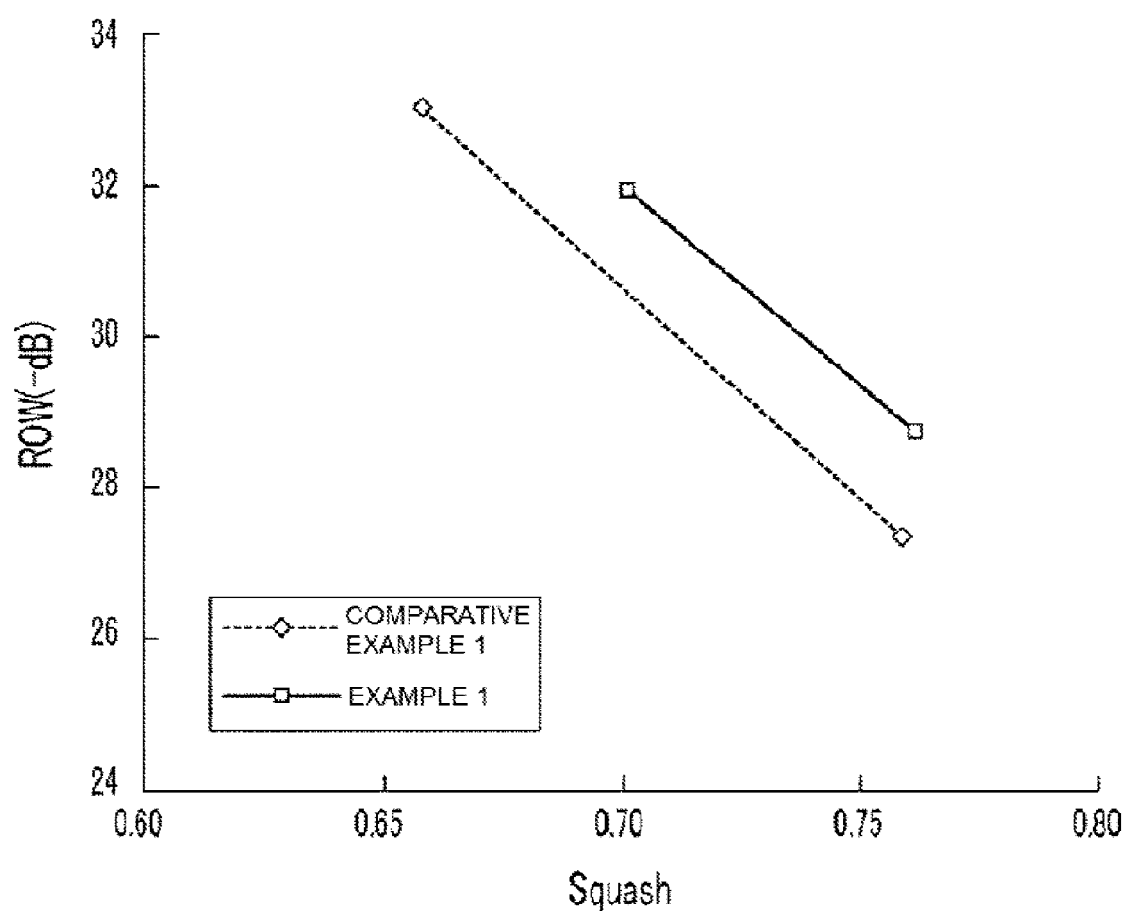
FIG. 3 plots Squash values versus ROW in Example 1 and Comparative Example 1.

|  | Soft magnetic underlayer 103 (nm) | Ru layer 104 (nm) | Pre-seed layer 106 (nm) | Seed layer 107 (nm) | Material of first nonmagnetic intermediate layer 108 | First nonmagnetic intermediate layer 108 (nm) | First nonmagnetic intermediate layer 108 (comparative examples only) (nm) | Second nonmagnetic intermediate layer 109 (nm) | Granular magnetic recording layers 110a + 110b (nm) | Nongranular magnetic recording layer 110c (nm) | Total thickness of magnetic recording layer 110 (nm) | Protective layer 114 (nm) |
| --- | --- | --- | --- | --- | --- | --- | --- | --- | --- | --- | --- | --- |
| Example 1-1 | 25 | 1.2 | 9.0 | 6 | Co—25Cr—5Ru—5W | 12 | — | 8 | 11.5 | 3.2 | 14.7 | 2.0 |
| Example 1-2 | 25 | 1.2 | 9.0 | 6 | Co—25Cr—5Ru—5W | 12 | — | 8 | 11.1 | 3.6 | 14.7 | 2.0 |
| Comparative Example 1-1 | 25 | 1.2 | 14 | 6 | CoCrMoRu/CoCrW | 10 | 3 | 8 | 11.8 | 3.0 | 14.8 | 2.0 |
| Comparative Example 1-2 | 25 | 1.2 | 14 | 6 | CoCrMoRu/CoCrW | 10 | 3 | 8 | 11.2 | 3.6 | 14.8 | 2.0 | shown in Table 2 and in FIG. 2 and FIG. 3. Compared with Comparative Examples 1-1 and 1-2, in Examples 1-1 and 1-2 using a Co25Cr5Ru5W alloy layer of thickness 12 nm as the first nonmagnetic intermediate layer 108, the MFSpiSNR was approximately 0.4 dB higher for the same ROW. The SqzSNR and Squash were the same values or higher, and results for Example 1 were more satisfactory than for Comparative Example 1.

Example 2

Figure 4:
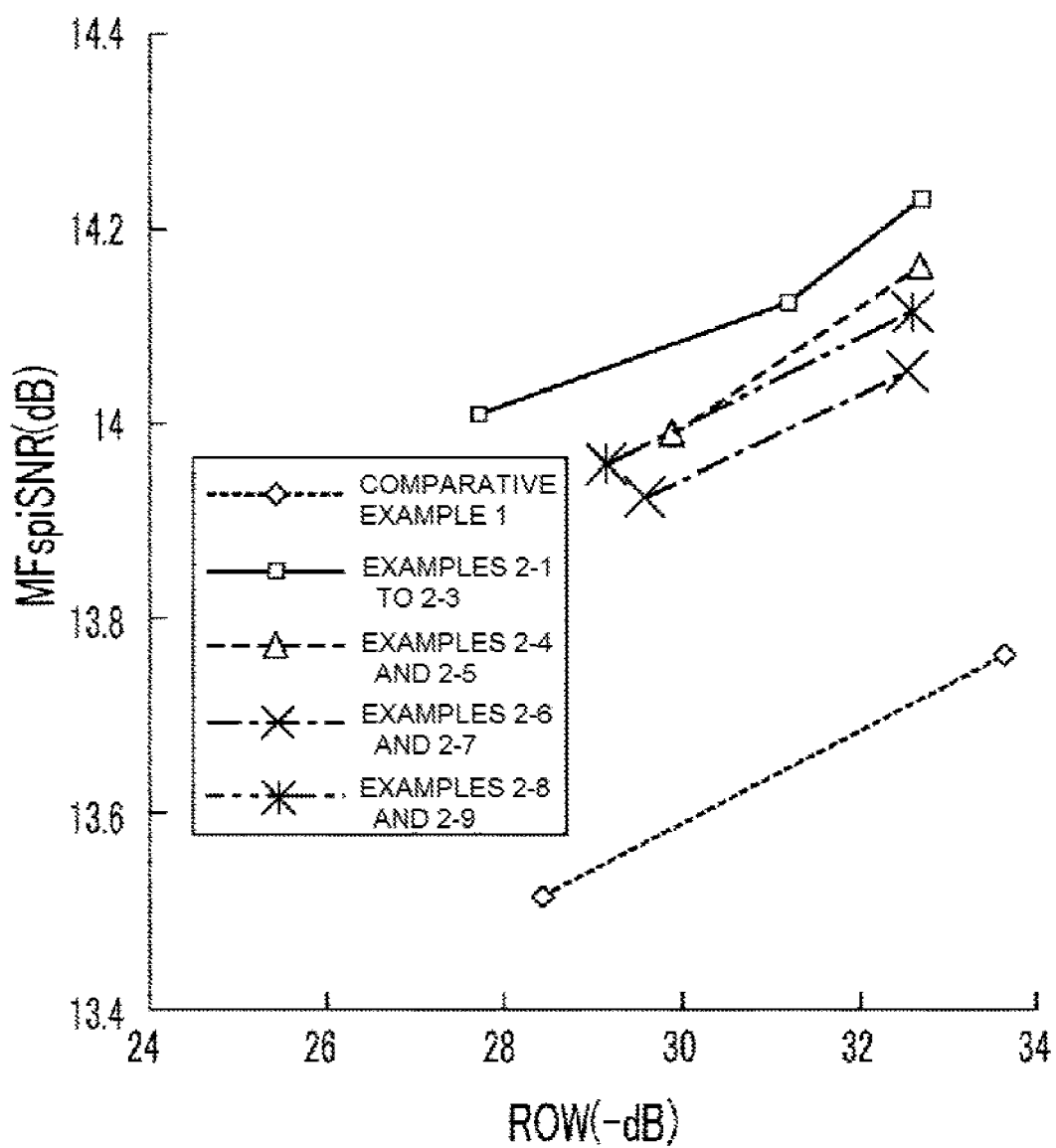
FIG. 4 plots MFspiSNR values versus ROW in Example 2 and Comparative Example 1.
Figure 5:
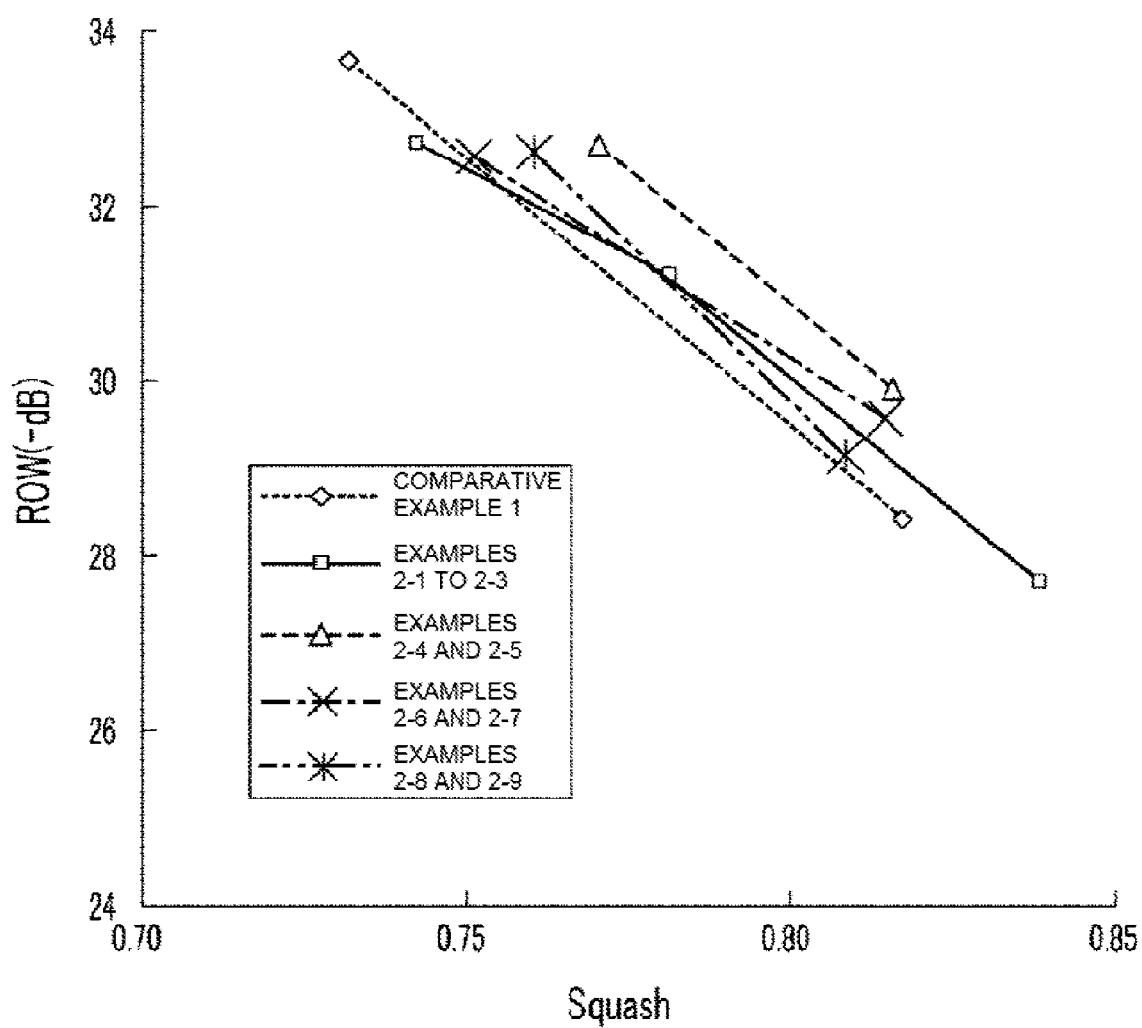
FIG. 5 plots Squash values versus ROW in Example 2 and Comparative Example 1.

Except for the fact that the soft magnetic underlayer 103 was formed from a FeCoZrTiNb alloy, the fact that the film thickness of the Ru single layer 104 between the first soft magnetic underlayer 103a and the second soft magnetic underlayer 103b was 0.4 nm, and the fact that the material and film thickness of the first nonmagnetic intermediate layer 108 were each changed as shown in Table 3, magnetic recording media similar to that of Example 1 were fabricated. The electromagnetic transducing characteristics of the fabricated magnetic recording media were evaluated similarly to Example 1. The results are shown in Table 4 and in FIG. 4 and FIG. 5.

TABLE 4-continued

| | ROW (−dB) | MFSpiSNR (dB) | SqzSNR (dB) | Squash50 |
|---|---|---|---|---|
| Comparative Example 1-1 | 28.4 | 13.5 | 13.1 | 0.82 |
| Comparative Example 1-2 | 33.6 | 13.8 | 12.9 | 0.73 |

For comparison with Example 2, the same Comparative Example 1 used with Example 1 was employed. In Example 2, in addition to the material of the first nonmagnetic intermediate layer 108, differences with Comparative Example 1 were the fact that the film thickness of the Ru single layer 104 in the soft magnetic underlayer 103 was 0.4 nm, that the film thickness of the pre-seed layer 106 was 14 nm, and that the film thickness of the first nonmagnetic intermediate layer 108 was different; the effect of these differences other than the material of the first nonmagnetic intermediate layer 108 on the electromagnetic transducing characteristics was, in terms of the value of MFSpiSNR for the same ROW, overall within approximately 0.2 dB.

TABLE 3

| | Soft magnetic underlayer 103 (nm) | Ru layer 104 (nm) | Pre-seed layer 106 (nm) | Seed layer 107 (nm) | Material of first nonmagnetic intermediate layer 108 | First nonmagnetic intermediate layer 108 (nm) | Second nonmagnetic intermediate layer 109 (nm) | Granular magnetic recording layers 110a + 110b (nm) | Nongranular magnetic recording layer 110c (nm) | Total thickness of magnetic recording layer 110 (nm) | Protective layer 114 (nm) |
|---|---|---|---|---|---|---|---|---|---|---|---|
| Example 2-1 | 30 | 0.4 | 9 | 6 | Co—25Cr—5Ru—5W | 12 | 8 | 11.1 | 3.7 | 14.8 | 2.0 |
| Example 2-2 | 30 | 0.4 | 9 | 6 | Co—25Cr—5Ru—5W | 12 | 8 | 11.4 | 3.4 | 14.8 | 2.0 |
| Example 2-1 | 30 | 0.4 | 9 | 6 | Co—25Cr—5Ru—5W | 12 | 8 | 10.8 | 4.0 | 14.8 | 2.0 |
| Example 2-3 | 30 | 0.4 | 9 | 6 | Co—25Cr—5Ru—5W | 12 | 8 | 10.8 | 4.0 | 14.8 | 2.0 |
| Example 2-4 | 30 | 0.4 | 9 | 6 | Co—25Cr—5Ru—5W | 10 | 8 | 11.3 | 3.5 | 14.8 | 2.0 |
| Example 2-5 | 30 | 0.4 | 9 | 6 | Co—25Cr—5Ru—5W | 10 | 8 | 10.9 | 3.9 | 14.8 | 2.0 |
| Example 2-6 | 30 | 0.4 | 9 | 6 | Co—25Cr—5Ru—5W | 9 | 8 | 11.3 | 3.5 | 14.8 | 2.0 |
| Example 2-7 | 30 | 0.4 | 9 | 6 | Co—25Cr—5Ru—5W | 9 | 8 | 10.9 | 3.9 | 14.8 | 2.0 |
| Example 2-8 | 30 | 0.4 | 9 | 6 | Co—25Cr—5Ru—5W | 8 | 8 | 11.4 | 3.4 | 14.8 | 2.0 |
| Example 2-9 | 30 | 0.4 | 9 | 6 | Co—25Cr—5Ru—5W | 8 | 8 | 11.0 | 3.8 | 14.8 | 2.0 |
| Comparative Example 1-1 | 25 | 1.2 | 14 | 6 | CoCrMoRu/CoCrW | 10 | 8 | 11.8 | 3.0 | 14.8 | 2.0 |
| Comparative Example 1-2 | 25 | 1.2 | 14 | 6 | CoCrMoRu/CoCrW | 10 | 8 | 11.2 | 3.6 | 14.8 | 2.0 |

TABLE 4

| | ROW (−dB) | MFSpiSNR (dB) | SqzSNR (dB) | Squash50 |
|---|---|---|---|---|
| Example 2-1 | 31.2 | 14.1 | 13.5 | 0.78 |
| Example 2-2 | 27.7 | 14.0 | 13.6 | 0.84 |
| Example 2-1 | 31.2 | 14.1 | 13.5 | 0.78 |
| Example 2-3 | 32.7 | 14.2 | 13.4 | 0.74 |
| Example 2-4 | 29.9 | 14.0 | 13.4 | 0.82 |
| Example 2-5 | 32.7 | 14.2 | 13.4 | 0.77 |
| Example 2-6 | 29.6 | 13.9 | 13.4 | 0.81 |
| Example 2-7 | 32.6 | 14.1 | 13.2 | 0.75 |
| Example 2-8 | 29.2 | 14.0 | 13.4 | 0.81 |
| Example 2-9 | 32.6 | 14.1 | 13.4 | 0.76 |

Compared with Comparative Examples 1-1 and 1-2, the MFSpiSNR for the same ROW of the Examples 2-1 to 2-9 was at least 0.3 dB higher approximately. Further, in Examples 2-4 to 2-6 in which the film thickness of the first nonmagnetic intermediate layer 108 was made the same 10 nm as in the Comparative Examples 1-1 and 1-2, the MFSpiSNR was at least 0.4 dB higher approximately compared with the Comparative Examples 1-1 and 1-2. The SqzSNR and Squash were also the same or higher, and more satisfactory results were obtained for Example 2 than for Comparative Example 1.

Hence it was found that magnetic recording media using a Co25Cr5Ru5W alloy in the first nonmagnetic intermediate layer 108 exhibit superior electromagnetic transducing characteristics compared with magnetic recording media using a stacked intermediate layer comprising a Co25Cr5Mo5Ru alloy layer of thickness 10 nm and a Co24Cr4W alloy layer of thickness 3 nm.

Example 3

Figure 6:
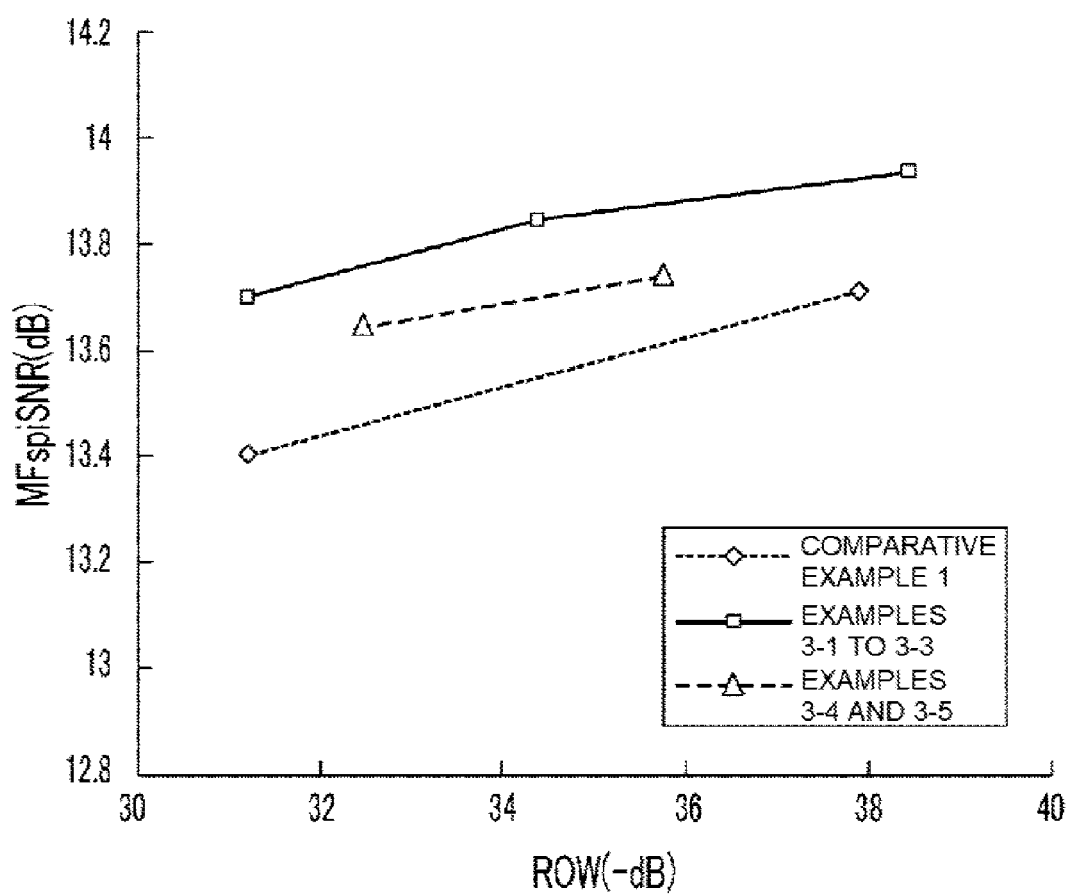
FIG. 6 plots MFspiSNR values versus ROW in Example 3 and Comparative Example 1.
Figure 7:
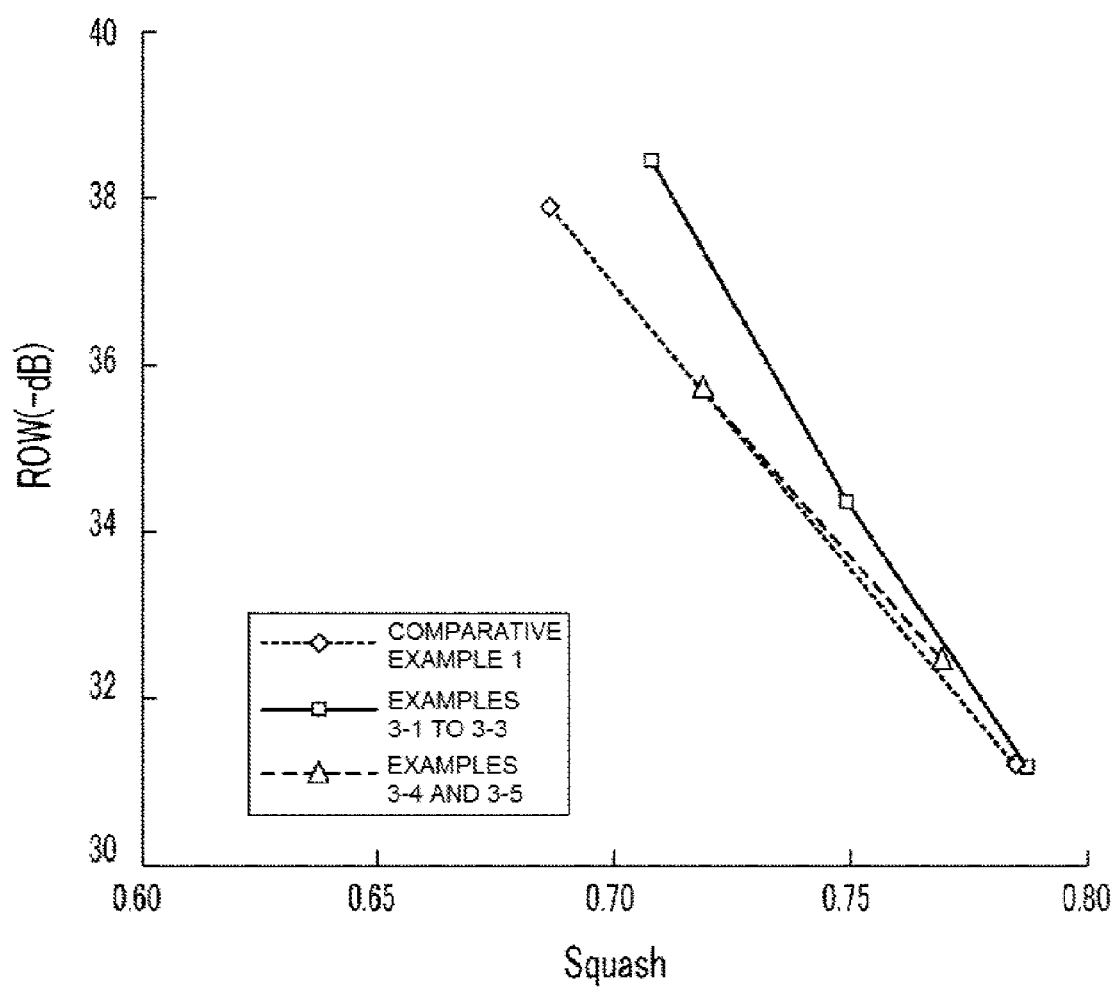
FIG. 7 plots Squash values versus ROW in Example 3 and Comparative Example 1.

Except for the fact that the soft magnetic underlayer 103 was formed from FeCoZrTiNb alloy and the fact that the material and film thickness of the first nonmagnetic intermediate layer 108 were both changed as shown in Table 5, magnetic recording media similar to that of Example 1 was fabricated. The electromagnetic transducing characteristics of the fabricated magnetic recording media were evaluated similarly to Example 1. The results are shown in Table 6 and in FIG. 6 and FIG. 7.

characteristics was, in terms of the value of MFSpiSNR for the same ROW, overall within approximately 0.1 dB.

Compared with Comparative Examples 1-1 and 1-2, the MFSpiSNR for the same ROW of the Examples 3-1 to 3-3 was approximately 0.2 to 0.3 dB higher. Further, in Examples 3-4 and 3-5 in which Co20Cr5W5Ru alloy was used as the material in the first nonmagnetic intermediate layer, the MFSpiSNR for the same ROW was 0.1 to 0.2 dB higher. The SqzSNR and Squash were also the same or higher, and more satisfactory results were obtained for Example 3 than for Comparative Example 1.

Hence it was found that magnetic recording media using a Co25Cr5W5Ru alloy or a Co20Cr5W5Ru alloy in the first

TABLE 5

| | Soft magnetic underlayer 103 (nm) | Ru layer 104 (nm) | Pre-seed layer 106 (nm) | Seed layer 107 (nm) | Material of first nonmagnetic intermediate layer 108 | First nonmagnetic intermediate layer 108 (nm) | Second nonmagnetic intermediate layer 109 (nm) | Granular magnetic recording layers 110a + 110b (nm) | Nongranular magnetic recording layer 110c (nm) | Total thickness of magnetic recording layer 110 (nm) | Protective layer 114 (nm) |
|---|---|---|---|---|---|---|---|---|---|---|---|
| Example 3-1 | 25 | 1.2 | 9 | 6 | Co—25Cr—5Ru—5W | 12 | 8 | 11.4 | 3.4 | 14.8 | 2.0 |
| Example 3-2 | 25 | 1.2 | 9 | 6 | Co—25Cr—5Ru—5W | 12 | 8 | 11.7 | 3.1 | 14.8 | 2.0 |
| Example 3-1 | 25 | 1.2 | 9 | 6 | Co—25Cr—5Ru—5W | 12 | 8 | 11.4 | 3.4 | 14.8 | 2.0 |
| Example 3-3 | 25 | 1.2 | 9 | 6 | Co—25Cr—5Ru—5W | 12 | 8 | 11.1 | 3.7 | 14.8 | 2.0 |
| Example 3-4 | 25 | 1.2 | 9 | 6 | Co—25Cr—5Ru—5W | 12 | 8 | 11.6 | 3.2 | 14.8 | 2.0 |
| Example 3-5 | 25 | 1.2 | 9 | 6 | Co—25Cr—5Ru—5W | 12 | 8 | 11.2 | 3.6 | 14.8 | 2.0 |
| Comparative Example 1-1 | 25 | 1.2 | 14 | 6 | CoCrMoRu/CoCrW | 10 | 8 | 11.8 | 3.0 | 14.8 | 2.0 |
| Comparative Example 1-2 | 25 | 1.2 | 14 | 6 | CoCrMoRu/CoCrW | 10 | 8 | 11.2 | 3.6 | 14.8 | 2.0 |

TABLE 6

| | ROW (−dB) | MFSpiSNR (dB) | SqzSNR (dB) | Squash50 |
|---|---|---|---|---|
| Example 3-1 | 34.4 | 13.8 | 13.0 | 0.75 |
| Example 3-2 | 31.2 | 13.7 | 13.0 | 0.79 |
| Example 3-1 | 34.4 | 13.8 | 13.0 | 0.75 |
| Example 3-3 | 38.4 | 13.9 | 12.8 | 0.71 |
| Example 3-4 | 32.5 | 13.6 | 12.9 | 0.77 |
| Example 3-5 | 35.8 | 13.7 | 12.8 | 0.72 |
| Comparative Example 1-1 | 31.2 | 13.4 | 12.8 | 0.78 |
| Comparative Example 1-2 | 37.9 | 13.7 | 12.6 | 0.69 |

For comparison with Example 3, the same Comparative Example 1 used with Example 1 was employed. In Example 3, in addition to the material of the first nonmagnetic intermediate layer 108, differences with Example 1 were the fact that the film thickness of the pre-seed layer 106 was 14 nm and that the film thickness of the first nonmagnetic intermediate layer 108 was different. The effect of these differences other than the material of the first nonmagnetic intermediate layer 108 on the electromagnetic transducing nonmagnetic intermediate layer 108 similarly exhibit superior electromagnetic transducing characteristics compared with magnetic recording media using a stacked intermediate layer comprising a Co25Cr5Mo5Ru alloy layer of thickness 10 nm and a Co24Cr4W alloy layer of thickness 3 nm.

xample 4

Except for the fact that a glass substrate of diameter 65 mm (Hoya Corp. no. N5) was used as the nonmagnetic substrate 101, the fact that the film thickness of the Ru single layer 104 between the first soft magnetic underlayer 103a and the second soft magnetic underlayer 103b was 0.25 nm, the fact that the thickness of the pre-seed layer 106 was 3 nm, and the fact that the material and film thickness of the first nonmagnetic intermediate layer 108 were both changed as shown in Table 7, magnetic recording media similar to that of Example 1 was fabricated.

TABLE 7

| | Soft magnetic underlayer 103 (nm) | Ru layer 104 (nm) | Pre-seed layer 106 (nm) | Seed layer 107 (nm) | Material of first nonmagnetic intermediate layer 108 | First nonmagnetic intermediate layer 108 (nm) | Second nonmagnetic intermediate layer 109 (nm) | Granular magnetic recording layers 110a + 110b (nm) | Nongranular magnetic recording layer 110c (nm) | Total thickness of magnetic recording layer 110 (nm) | Protective layer 114 (nm) |
|---|---|---|---|---|---|---|---|---|---|---|---|
| Example 4-1 | 30 | 0.25 | 3 | 3.6 | Co—20Cr—15Ru—5W | 6 | 7 | 5.4 | 5.4 | 13.5 | 2.0 |
| Example 4-2 | 30 | 0.25 | 3 | 3.6 | Co—20Cr—15Ru—5W | 6 | 7 | 6.0 | 4.8 | 13.5 | 2.0 |
| Example 4-3 | 30 | 0.25 | 3 | 3.6 | Co—20Cr—5W—5Ru | 6 | 7 | 5.4 | 5.4 | 13.5 | 2.0 |
| Example 4-4 | 30 | 0.25 | 3 | 3.6 | Co—20Cr—5W—5Ru | 6 | 7 | 6.0 | 4.8 | 13.5 | 2.0 |

(Evaluation Test 2)

Electromagnetic transducing characteristics of the magnetic recording media obtained in Example 4 were evaluated by MFSpiSNR, SqzSNR, Squash, and ROW similarly to the Evaluation Test 1, at a radial position of 22.3 mm, under conditions, at maximum, of a linear recording density of approximately 2000 kfci and a track pitch of 400 ktpi. Results are shown in Table 8 and in FIG. 8 and FIG. 9. The ROW value measured when a signal with a linear recording density of 997 kfci was overwritten by a signal with a linear recording density of 133 kfci was used.

Figure 8:
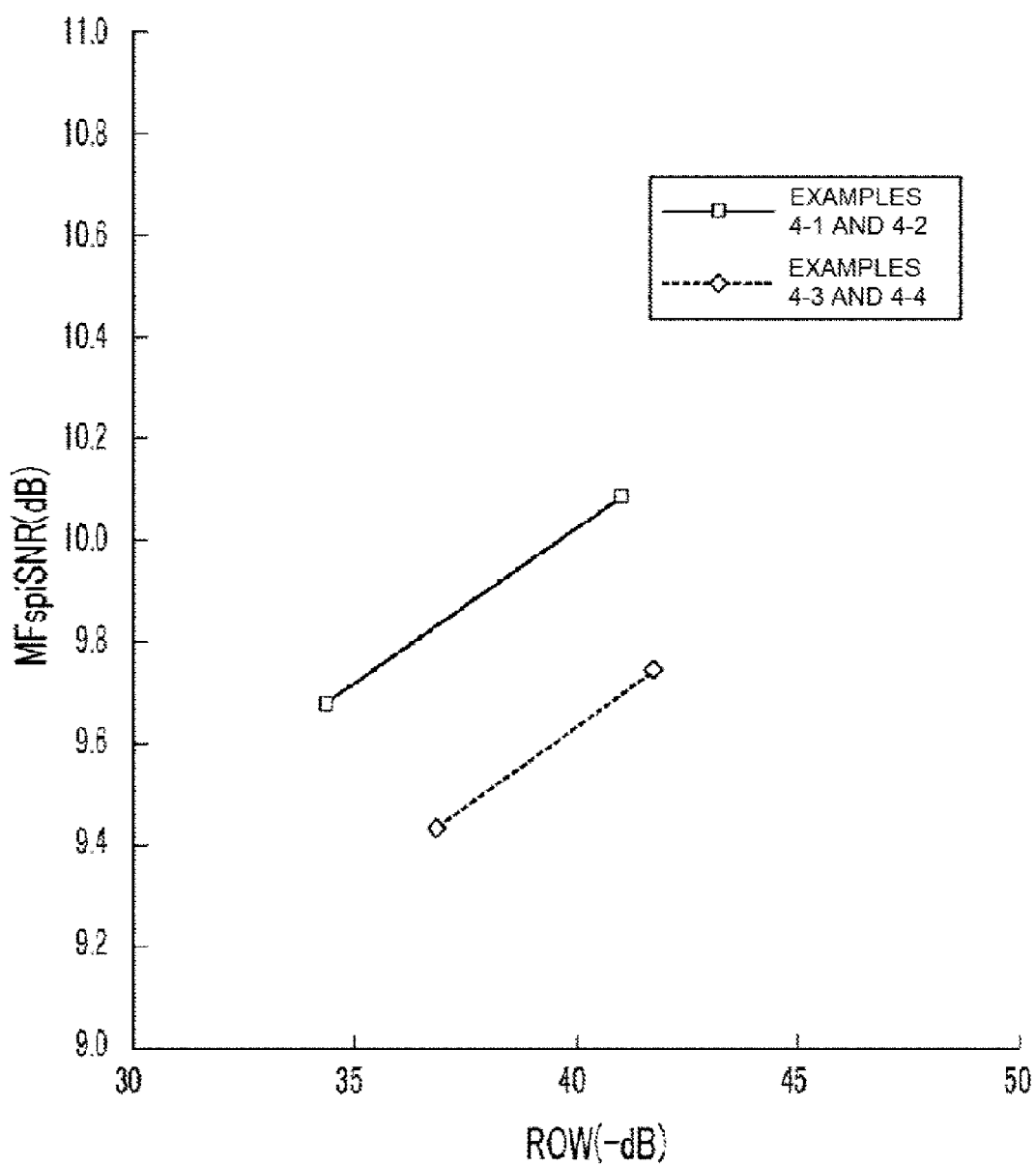
FIG. 8 plots MFspiSNR values versus ROW in Example 4 and Comparative Example 1.
Figure 9:
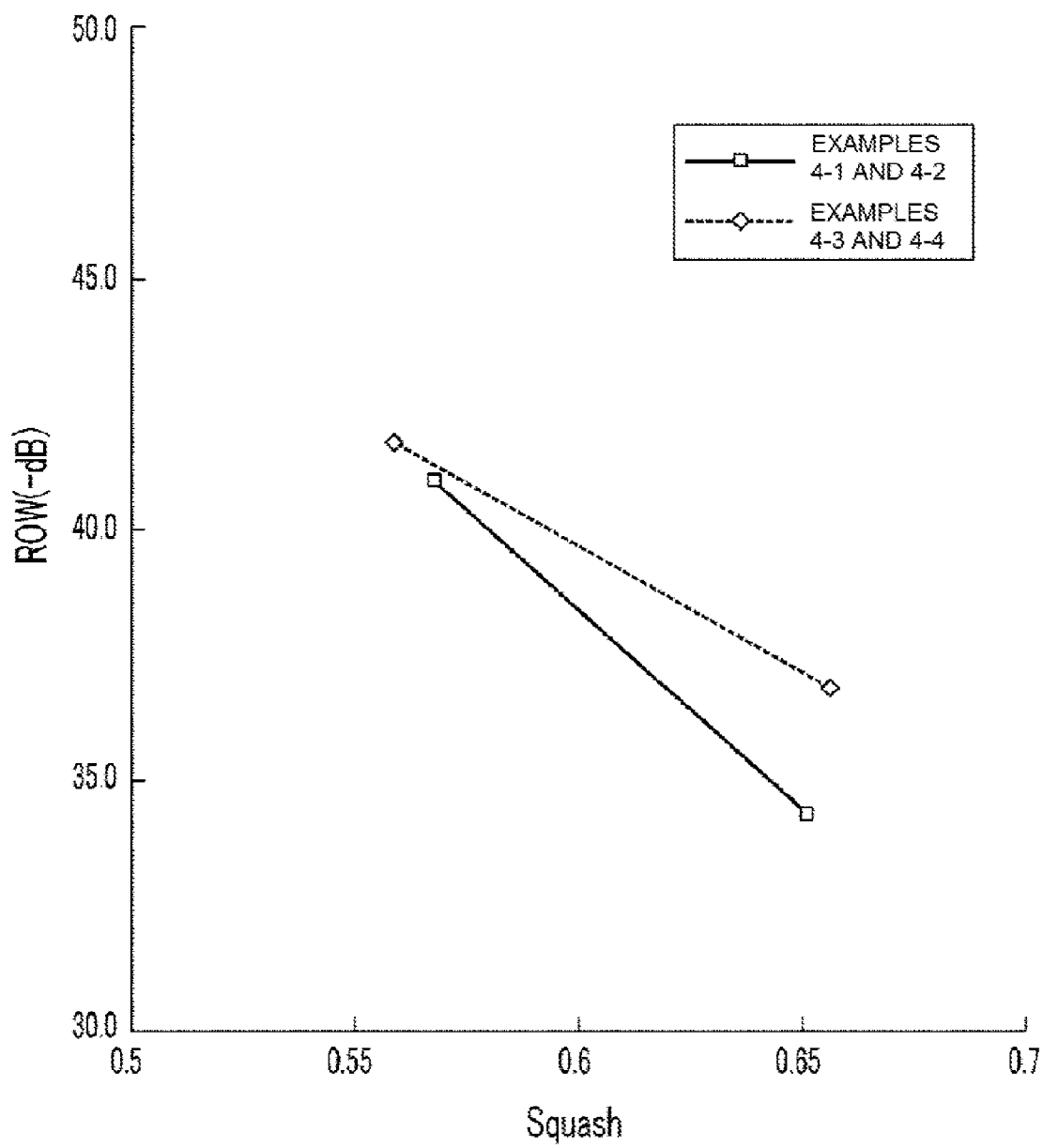
FIG. 9 plots Squash values versus ROW in Example 4 and Comparative Example 1.

As shown in FIG. 8 and FIG. 9, it was confirmed that Examples 4-1 to 4-4 all had satisfactory electromagnetic transducing characteristics.

TABLE 8

| | ROW (−dB) | MFSpiSNR (dB) | SqzSNR (dB) | Squash |
|---|---|---|---|---|
| Example 4-1 | 41.0 | 10.09 | 6.48 | 0.57 |
| Example 4-2 | 34.4 | 9.68 | 7.28 | 0.65 |
| Example 4-3 | 41.7 | 9.75 | 5.99 | 0.56 |
| Example 4-4 | 36.9 | 9.43 | 7.08 | 0.66 |

Example 5

Except for the fact that a glass substrate of diameter 65 mm was used as the nonmagnetic substrate 101, the fact that the film thickness of the Ru single layer 104 between the first soft magnetic underlayer 103a and the second soft magnetic underlayer 103b was 0.25 nm, the fact that the thickness of the pre-seed layer 106 was 3 nm, and the fact that the material and film thickness of the first nonmagnetic intermediate layer 108 were both changed as shown in Table 9, magnetic recording media similar to that of Example 1 was fabricated.

TABLE 9

| | Soft magnetic underlayer 103 (nm) | Ru layer 104 (nm) | Pre-seed layer 106 (nm) | Seed layer 107 (nm) | Material of first nonmagnetic intermediate layer 108 | First nonmagnetic intermediate layer 108 (nm) | Second nonmagnetic intermediate layer 109 (nm) | Granular magnetic recording layers 110a + 110b (nm) | Nongranular magnetic recording layer 110c (nm) | Total thickness of magnetic recording layer 110 (nm) | Protective layer 114 (nm) |
|---|---|---|---|---|---|---|---|---|---|---|---|
| Example 5-1 | 25 | 0.25 | 3 | 3.49 | Co—15Cr—15Ru—5W | 4 | 7 | 5.6 | 4.9 | 13.5 | 2.0 |
| Example 5-2 | 25 | 0.25 | 3 | 3.49 | Co—15Cr—15Ru—5W | 4 | 7 | 6.2 | 4.3 | 13.5 | 2.0 |
| Example 5-3 | 25 | 0.25 | 3 | 3.49 | Co—15Cr—15Ru—5W | 6 | 7 | 5.6 | 4.9 | 13.5 | 2.0 |
| Example 5-4 | 25 | 0.25 | 3 | 3.49 | Co—15Cr—15Ru—5W | 6 | 7 | 6.2 | 4.3 | 13.5 | 2.0 |
| Example 5-5 | 25 | 0.25 | 3 | 3.49 | Co—15Cr—15Ru—5W | 8 | 7 | 5.6 | 4.9 | 13.5 | 2.0 |
| Example 5-6 | 25 | 0.25 | 3 | 3.49 | Co—15Cr—15Ru—5W | 8 | 7 | 6.2 | 4.3 | 13.5 | 2.0 |
| Example 5-7 | 25 | 0.25 | 3 | 3.49 | Co—15Cr—15Ru—5W | 10 | 7 | 5.6 | 4.9 | 13.5 | 2.0 |
| Example 5-8 | 25 | 0.25 | 3 | 3.49 | Co—15Cr—15Ru—5W | 10 | 7 | 6.2 | 4.3 | 13.5 | 2.0 |
| Example 5-9 | 25 | 0.25 | 3 | 3.49 | Co—20Cr—5W—5Ru | 6 | 7 | 5.6 | 4.9 | 13.5 | 2.0 |
| Example 5-10 | 25 | 0.25 | 3 | 3.49 | Co—20Cr—5W—5Ru | 6 | 7 | 6.2 | 4.3 | 13.5 | 2.0 |

(Evaluation Test 3)

Electromagnetic transducing characteristics of the magnetic recording media obtained in Example 5 were evaluated by MFSpiSNR, SqzSNR, Squash, and ROW similarly to the Evaluation Test 1, at a radial position of 29.0 mm, under conditions, at maximum, of a linear recording density of approximately 2000 kfci and a track pitch of 400 ktpi. Results are shown in Table 10 and in FIG. 10 and FIG. 11. The ROW value measured when a signal with a linear recording density of 926 kfci was overwritten by a signal with a linear recording density of 123 kfci was used.

Figure 10:
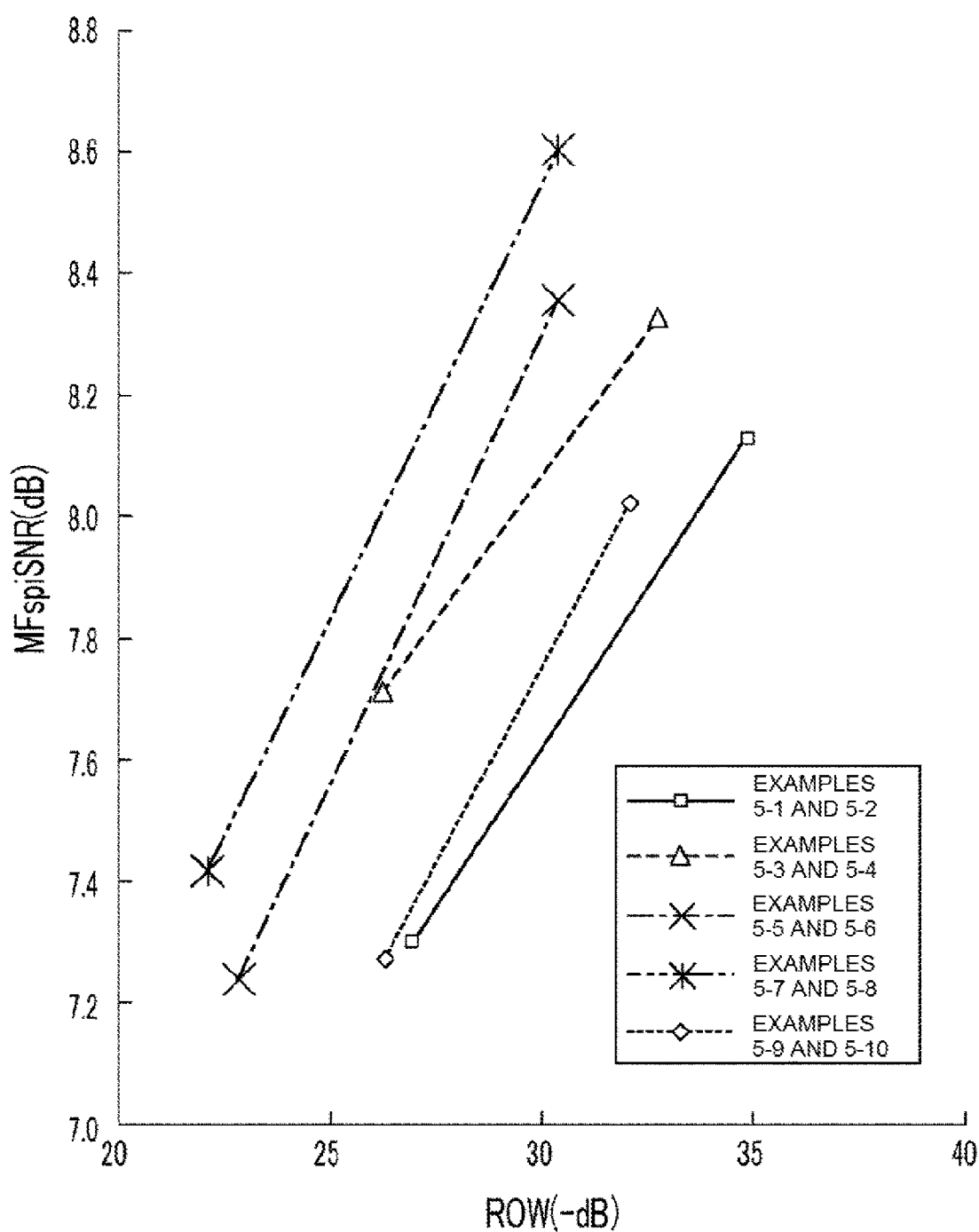
FIG. 10 plots MFspiSNR values versus ROW in Example 5.
Figure 11:
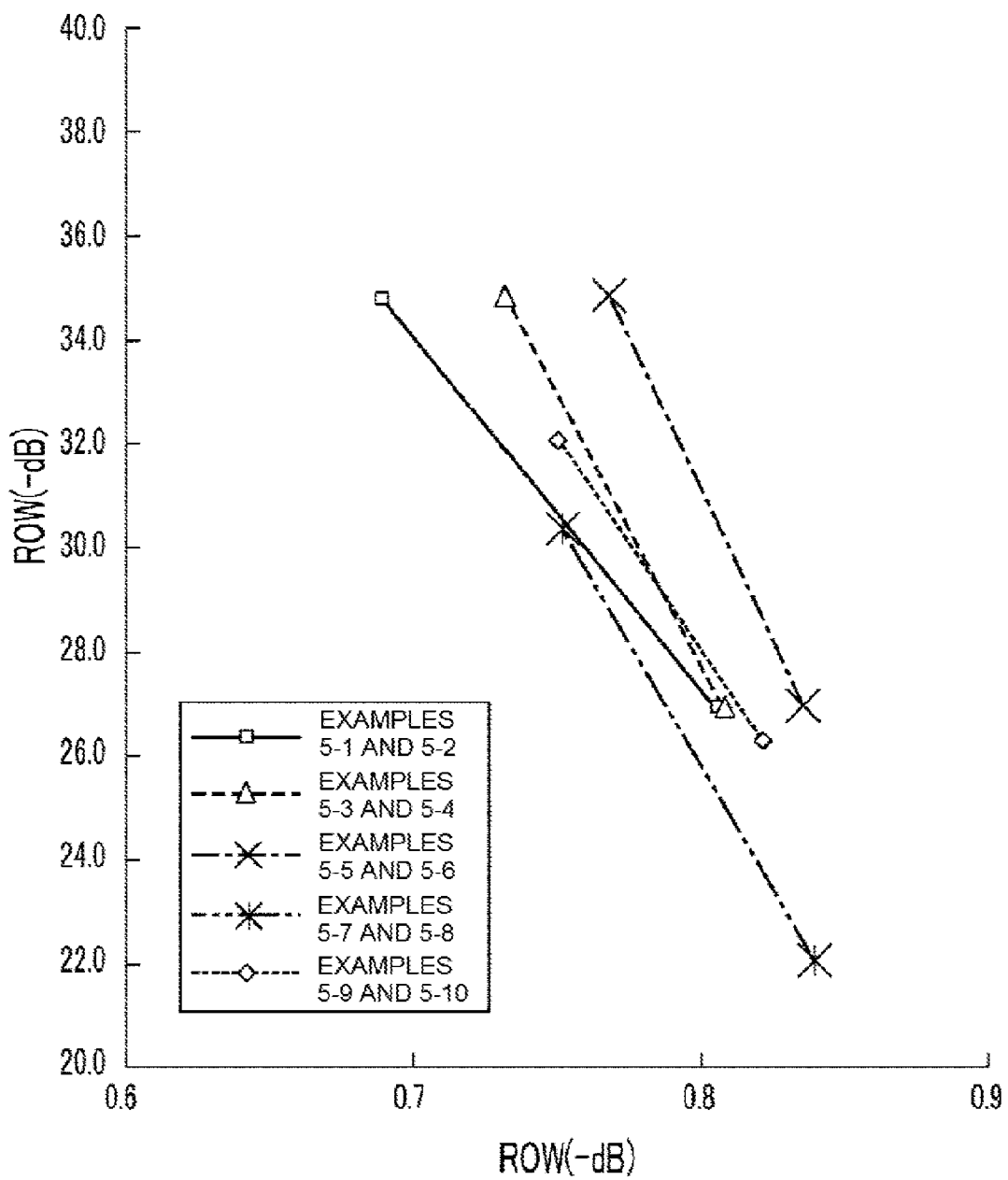
FIG. 11 plots Squash values versus ROW in Example 5.

As shown in FIG. 10 and FIG. 11, it was confirmed that Examples 5-1 to 5-10 all had satisfactory electromagnetic transducing characteristics.

the pre-seed layer 106 was 6 nm, and the fact that the material and film thickness of the first nonmagnetic intermediate layer 108 were both changed as shown in Table 11, magnetic recording media similar to that of Example 1 was fabricated.

TABLE 11

| | Soft magnetic underlayer 103 (nm) | Ru layer 104 (nm) | Pre-seed layer 106 (nm) | Seed layer 107 (nm) | Material of first nonmagnetic intermediate layer 108 | First nonmagnetic intermediate layer 108 (nm) | Second nonmagnetic intermediate layer 109 (nm) | Granular magnetic recording layers 110a + 110b (nm) | Nongranular magnetic recording layer 110c (nm) | Total thickness of magnetic recording layer 110 (nm) | Protective layer 114 (nm) |
|---|---|---|---|---|---|---|---|---|---|---|---|
| Example 6-1 | 25 | 0.25 | 6 | 3.49 | Co10Cr15Ru5W | 6 | 7 | 5.3 | 5.1 | 13.5 | 2.0 |
| Example 6-2 | 25 | 0.25 | 6 | 3.49 | Co10Cr15Ru5W | 6 | 7 | 5.9 | 4.5 | 13.5 | 2.0 |
| Example 6-3 | 25 | 0.25 | 6 | 3.49 | Co10Cr15Ru5W | 8 | 7 | 5.3 | 5.1 | 13.5 | 2.0 |
| Example 6-4 | 25 | 0.25 | 6 | 3.49 | Co10Cr15Ru5W | 8 | 7 | 5.9 | 4.5 | 13.5 | 2.0 |
| Example 6-5 | 25 | 0.25 | 6 | 3.49 | Co10Cr15Ru5W | 10 | 7 | 5.3 | 5.1 | 13.5 | 2.0 |
| Example 6-6 | 25 | 0.25 | 6 | 3.49 | Co10Cr15Ru5W | 10 | 7 | 5.9 | 4.5 | 13.5 | 2.0 |
| Example 6-7 | 25 | 0.25 | 6 | 3.49 | Co10Cr15Ru5W | 6 | 7 | 5.3 | 5.1 | 13.5 | 2.0 |
| Example 6-8 | 25 | 0.25 | 6 | 3.49 | Co10Cr15Ru5W | 6 | 7 | 5.9 | 4.5 | 13.5 | 2.0 |
| Example 6-9 | 25 | 0.25 | 6 | 3.49 | Co10Cr15Ru5W | 8 | 7 | 5.3 | 5.1 | 13.5 | 2.0 |
| Example 6-10 | 25 | 0.25 | 6 | 3.49 | Co10Cr15Ru5W | 8 | 7 | 5.9 | 4.5 | 13.5 | 2.0 |

Figure 12:
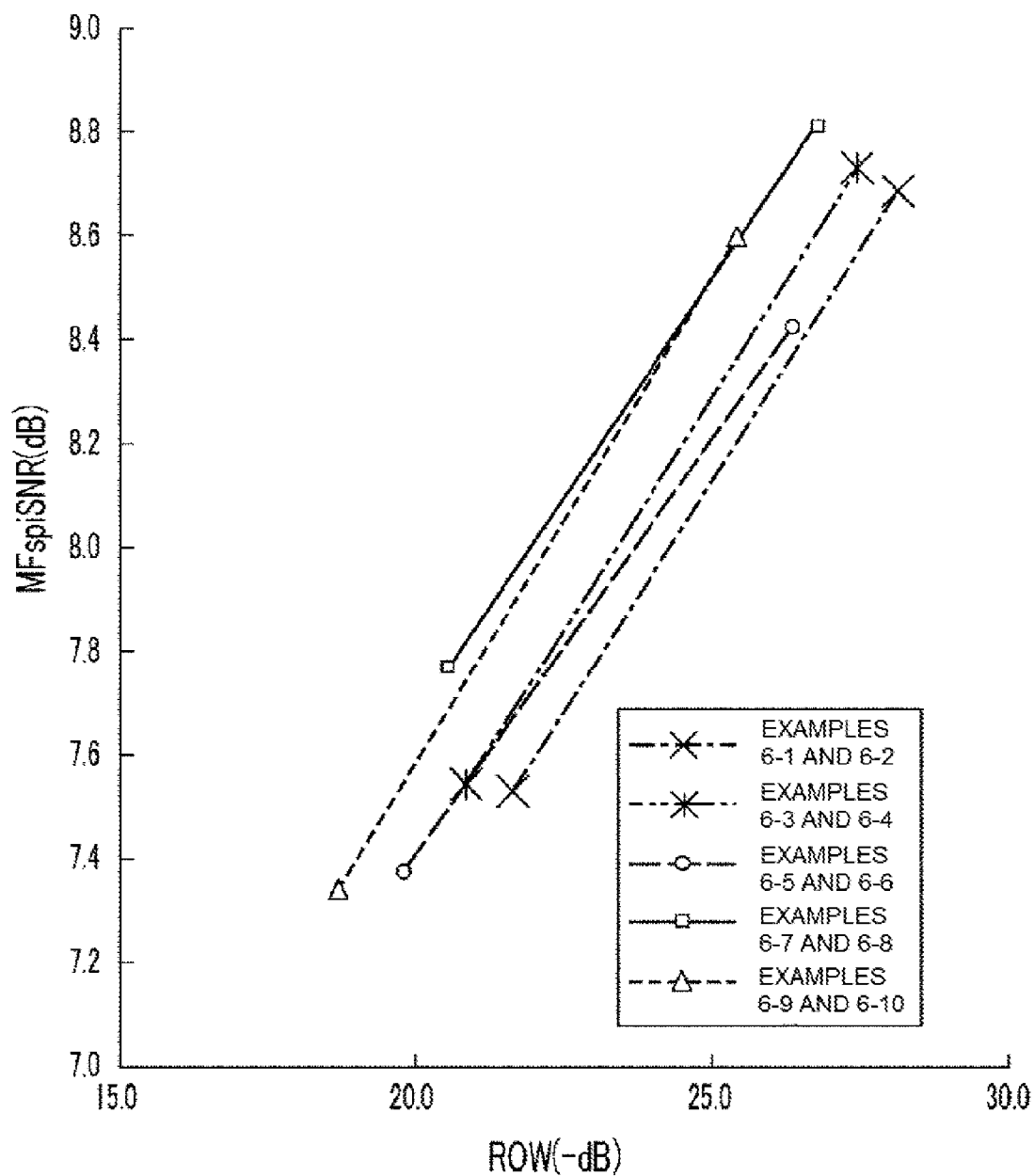
FIG. 12 plots MFspiSNR values versus ROW in Example 6.

The electromagnetic transducing characteristics of the fabricated magnetic recording media were evaluated under conditions similar to those for Example 5. Results are shown in Table 12 and in FIG. 12 and FIG. 13. As shown in FIG. 12 and FIG. 13, it was confirmed that Examples 6-1 to 6-10 all had satisfactory electromagnetic transducing characteristics. Further, as the first nonmagnetic intermediate layer 108, using a Co15Cr15Ru5W alloy film of thickness 6 nm resulted in more satisfactory characteristics than a Co10Cr15Ru5W alloy film of thickness 6 nm.

TABLE 10

| | ROW (−dB) | MFSpiSNR (dB) | SqzSNR (dB) | Squash |
|---|---|---|---|---|
| Example 5-1 | 34.9 | 8.1 | 7.5 | 0.69 |
| Example 5-2 | 26.9 | 7.3 | 7.2 | 0.81 |
| Example 5-3 | 32.8 | 8.3 | 8.1 | 0.73 |
| Example 5-4 | 26.2 | 7.7 | 7.6 | 0.81 |
| Example 5-5 | 30.4 | 8.4 | 8.1 | 0.77 |
| Example 5-6 | 22.8 | 7.2 | 7.2 | 0.84 |
| Example 5-7 | 30.4 | 8.6 | 8.3 | 0.75 |
| Example 5-8 | 22.1 | 7.4 | 7.3 | 0.84 |
| Example 5-9 | 32.1 | 8.0 | 7.7 | 0.75 |
| Example 5-10 | 26.3 | 7.3 | 7.2 | 0.82 |

TABLE 12

| Disk | ROW (−dB) | MFSpiSNR (dB) | SqzSNR (dB) | Squash |
|---|---|---|---|---|
| Example 6-1 | 28.1 | 8.7 | 8.0 | 0.66 |
| Example 6-2 | 21.6 | 7.5 | 7.1 | 0.73 |
| Example 6-3 | 27.4 | 8.7 | 8.3 | 0.69 |
| Example 6-4 | 20.8 | 7.5 | 7.5 | 0.79 |
| Example 6-5 | 26.4 | 8.4 | 8.1 | 0.71 |
| Example 6-6 | 19.8 | 7.4 | 7.4 | 0.79 |
| Example 6-7 | 26.8 | 8.8 | 8.3 | 0.68 |
| Example 6-8 | 20.6 | 7.8 | 7.7 | 0.78 |
| Example 6-9 | 25.4 | 8.6 | 8.1 | 0.67 |
| Example 6-10 | 18.7 | 7.3 | 7.3 | 0.80 |

Example 6

Except for the fact that a glass substrate of diameter 65 mm was used as the nonmagnetic substrate 101, the fact that the film thickness of the Ru single layer 104 between the first soft magnetic underlayer 103a and the second soft magnetic underlayer 103b was 0.25 nm, the fact that the thickness of Example 7

Except for using a CoTi layer as the pre-seed layer 106, a method similar to Example 1 was used, to fabricate a measurement sample for XRD crystal structure analysis by forming, in order on a nonmagnetic substrate 101 comprising an Al substrate of diameter 95 mm, a adhesive layer 102, first soft magnetic underlayer 103a, Ru layer 104, second soft magnetic underlayer 103b, pre-seed layer 106, seed layer 107, first nonmagnetic intermediate layer 108, Ru single layer, second nonmagnetic intermediate layer 109, and first magnetic recording layer 110a, and then forming thereupon a protective layer 114.

Comparative Example 2

Except for the fact that a Co25Cr5Mo5Ru5Mn alloy was used in the first nonmagnetic intermediate layer 108, a measurement sample for XRD crystal structure analysis similar to that of Example 7 was fabricated.

(Evaluation Test 4)

An X-ray diffraction apparatus (Rint-Ultima III manufactured by Rigaku Corp.) was used to perform XRD crystal structure analyses of the measurement samples fabricated in Example 7 and Comparative Example 2. Table 13 shows the layer configurations and XRD crystal structure analysis results. Compared with Comparative Example 2 in which the Co25Cr5Mo5Ru5Mn alloy was used in the first nonmagnetic intermediate layer 108, Example 7, which used the Co25Cr5Ru5W alloy film in the first nonmagnetic intermediate layer 108 showed tendencies for reduced half-maximum width (FWHM) at 42.2° and 42.6°, corresponding to the hcp (002) plane of the sample, so that the c axis orientation was satisfactory.

TABLE 13

| | Material of first nonmagnetic intermediate layer 108 | First nonmagnetic intermediate layer 108 (nm) | Half-maximum width 42.2° | 42.6° |
|---|---|---|---|---|
| Example 7 | Co25Cr5Ru5W | 12 | 3.002 | 3.017 |
| Comparative Example 4 | Co25Cr5Ru5Mo5Mn | 12 | 3.029 | 3.027 |

EXPLANATION OF REFERENCE NUMERALS

101 Nonmagnetic substrate
103 Soft magnetic underlayer
106 Pre-seed layer
107 Seed layer
108 First nonmagnetic intermediate layer
109 Second nonmagnetic intermediate layer
110 Magnetic recording layer
114 Protective layer
115 Lubricating layer

The invention claimed is:

1. A perpendicular magnetic recording medium comprising:
   a nonmagnetic substrate;
   a first nonmagnetic intermediate layer above the nonmagnetic substrate;
   a second nonmagnetic intermediate layer on the first nonmagnetic intermediate layer; and
   a magnetic recording layer on the second nonmagnetic intermediate layer;
   wherein the first nonmagnetic intermediate layer is formed from a CoCrRuW alloy, and the second nonmagnetic intermediate layer is formed from an Ru-base alloy; and
   wherein the CoCrRuW alloy has a Cr content of 14.5 at % or higher and 25.5 at % or lower, a Ru content of 4.5 at % or higher and 20.5 at % or lower, and a W content of 4.5 at % or higher and 8.5 at % or lower, and wherein a remainder of the CoCrRuW alloy is Co.

2. The perpendicular magnetic recording medium according to claim 1, wherein the magnetic recording layer includes a granular structure.

3. The perpendicular magnetic recording medium according to claim 1, wherein a film thickness of the first nonmagnetic intermediate layer is from 5 to 14 nm.

4. A method of manufacturing a perpendicular magnetic recording medium,
   the method comprising a step of stacking, in order on a nonmagnetic substrate, a first nonmagnetic intermediate layer, a second nonmagnetic intermediate layer, and a magnetic recording layer,
   wherein the first nonmagnetic intermediate layer is formed from a CoCrRuW alloy, and the second nonmagnetic intermediate layer is formed from an Ru-base alloy and
   wherein the CoCrRuW alloy has a Cr content of 14.5 at % or higher and 25.5 at % or lower, a Ru content of 4.5 at % or higher and 20.5 at % or lower, and a W content of 4.5 at % or higher and 8.5 at % or lower, and wherein a remainder of the CoCrRuW alloy is Co.

5. The manufacturing method according to claim 4, wherein the magnetic recording layer includes a granular structure.

* * * * *